United States Patent
Sotgiu et al.

(10) Patent No.: US 11,214,103 B2
(45) Date of Patent: Jan. 4, 2022

(54) METHOD FOR MOUNTING AND DEMOUNTING A TYRE TO AND FROM A WHEEL RIM

(71) Applicant: Snap-on Equipment Srl a unico socio, Correggio (IT)

(72) Inventors: Paolo Sotgiu, Modena (IT); Francesco Braghiroli, Reggio Emilia (IT)

(73) Assignee: Snap-on Equipment Srl a unico socio, Correggio (IT)

( * ) Notice: Subject to any disclaimer, the term of this patent is extended or adjusted under 35 U.S.C. 154(b) by 1056 days.

(21) Appl. No.: 14/569,493

(22) Filed: Dec. 12, 2014

(65) Prior Publication Data

US 2015/0343862 A1 Dec. 3, 2015

(30) Foreign Application Priority Data

May 30, 2014 (EP) .................................. 14170632
May 30, 2014 (EP) .................................. 14170635

(51) Int. Cl.
*B60C 25/05* (2006.01)
*B60C 25/138* (2006.01)

(52) U.S. Cl.
CPC ........ *B60C 25/056* (2013.01); *B60C 25/0548* (2013.01); *B60C 25/0554* (2013.01);
(Continued)

(58) Field of Classification Search
CPC .............. B60C 25/138; B60C 25/0593; B60C 25/0578; B60C 25/056; B60C 25/0554; B60C 25/0548

(Continued)

(56) References Cited

U.S. PATENT DOCUMENTS 3,267,983 A * 8/1966 Furrer .................. B60C 25/132
                                                    157/1.24
6,125,904 A * 10/2000 Kane ................... B60C 25/0515
                                                    157/1

(Continued)

FOREIGN PATENT DOCUMENTS

CN          1935540 A       3/2007
CN        101492001 A       7/2009

(Continued)

OTHER PUBLICATIONS

Extended European Search Report issued in Application No. 14197791.8 dated Oct. 7, 2015.

(Continued)

*Primary Examiner* — Joseph J Hail
*Assistant Examiner* — Arman Milanian
(74) *Attorney, Agent, or Firm* — Studebaker & Brackett PC

(57) ABSTRACT

The invention relates to a method for mounting/demounting a tyre (T) on a rim (R). The method comprises the steps of: determining an initial reference position for the mounting/demounting device (U1, U2), said initial reference position being proximal to an edge (E) of the wheel rim (R); linking the position of the mounting/demounting device (U1, U2) with the initial reference position; adjusting the position of the mounting/demounting device (U1, U2) with respect to either the first or the second direction; continuously detecting the position of the mounting/demounting device (U1, U2) with respect to said either first or second direction; and continuously and automatically adjusting the position of the mounting/demounting device (U1, U2), with respect to the other one of said either first or second direction, at least in dependence of the initial reference position.

14 Claims, 15 Drawing Sheets

(52) U.S. Cl.
CPC ...... *B60C 25/0578* (2013.01); *B60C 25/0593* (2013.01); *B60C 25/138* (2013.01)

(58) Field of Classification Search
USPC ........................................ 157/1.17; 356/155
See application file for complete search history.

(56) References Cited

U.S. PATENT DOCUMENTS

| | | | | |
|---|---|---|---|---|
| 6,619,362 | B2* | 9/2003 | Corghi | B60C 25/138 157/1.24 |
| 6,629,554 | B2* | 10/2003 | Mimura | B60C 25/138 157/1.17 |
| 6,880,605 | B2* | 4/2005 | Corghi | B60C 25/138 157/1.24 |
| 7,089,987 | B2* | 8/2006 | Gonzaga | B60C 25/138 157/1.17 |
| 7,128,119 | B2* | 10/2006 | Corghi | B60C 25/138 157/1.22 |
| 7,466,430 | B2* | 12/2008 | Braghiroli | G01M 1/02 356/601 |
| 7,497,761 | B2* | 3/2009 | Gonzaga | B60C 25/138 157/1.17 |
| 8,250,915 | B1* | 8/2012 | Voeller | G01M 17/021 73/460 |
| 8,276,641 | B2* | 10/2012 | Matteucci | B60C 25/138 157/1.24 |
| 8,284,390 | B1 | 10/2012 | Clasquin et al. | |
| 8,387,675 | B1* | 3/2013 | Vaninger | B60C 25/138 157/1.17 |
| 8,613,303 | B1* | 12/2013 | Hanneken | B60C 25/138 157/1.17 |
| 8,684,060 | B2* | 4/2014 | Corghi | B60C 25/0593 157/1.22 |
| 8,752,605 | B2* | 6/2014 | Gonzaga | B60C 25/138 157/1.3 |
| 8,770,254 | B1* | 7/2014 | Hanneken | B60C 25/138 157/1.17 |
| 8,783,326 | B1* | 7/2014 | Vaninger | B60C 25/0551 157/1.24 |
| 8,905,112 | B2* | 12/2014 | Gonzaga | B60C 25/0593 157/1.24 |
| 8,943,880 | B2* | 2/2015 | Vignoli | B60C 25/0554 73/146 |
| 8,985,178 | B1* | 3/2015 | Vaninger | B60C 25/056 157/1.1 |
| 9,090,135 | B2* | 7/2015 | Magnani | B60C 25/138 |
| 9,517,667 | B2* | 12/2016 | Sotgiu | B60C 25/138 |
| 2001/0042601 | A1* | 11/2001 | Corghi | B60C 25/0545 157/1.26 |
| 2003/0084977 | A1* | 5/2003 | Gonzaga | B60C 13/001 152/381.5 |
| 2004/0165180 | A1* | 8/2004 | Voeller | B60C 11/24 356/139.09 |
| 2005/0055153 | A1* | 3/2005 | Braghiroli | G01M 1/225 701/124 |
| 2005/0173037 | A1* | 8/2005 | Bocquet | B60B 21/023 152/379.3 |
| 2005/0241776 | A1* | 11/2005 | Gonzaga | B60C 25/138 157/1.17 |
| 2008/0123107 | A1* | 5/2008 | Sotgiu | B60C 25/0554 356/601 |
| 2009/0266494 | A1* | 10/2009 | Sotgiu | B60C 25/135 157/1.24 |
| 2011/0100558 | A1* | 5/2011 | Corghi | B60C 25/056 157/1.1 |
| 2012/0138239 | A1* | 6/2012 | Mimura | B60C 25/0539 157/1.26 |
| 2014/0034248 | A1* | 2/2014 | Gonzaga | B60C 25/0593 157/1.24 |
| 2015/0096692 | A1 | 4/2015 | Molbach et al. | |
| 2015/0298514 | A1* | 10/2015 | Nicolini | B60C 25/056 157/1.24 |

FOREIGN PATENT DOCUMENTS

| | | |
|---|---|---|
| CN | 102555701 A | 7/2012 |
| DE | 2529343 A1 | 1/1977 |
| DE | 4415064 A1 | 12/1994 |
| EP | 1398184 A1 | 3/2004 |
| EP | 1479539 A2 | 11/2004 |
| EP | 1515129 A1 | 3/2005 |
| EP | 1714807 A1 | 10/2006 |
| EP | 1724129 B1 | 3/2008 |
| EP | 1927484 A1 | 6/2008 |
| EP | 1946946 A1 | 7/2008 |
| EP | 2110170 A2 | 10/2009 |
| EP | 2110270 B1 | 12/2010 |
| EP | 2347919 A1 | 7/2011 |
| EP | 1625954 B1 | 12/2011 |
| EP | 2524821 A1 | 11/2012 |
| EP | 2484541 B1 | 1/2013 |
| EP | 1157860 B2 | 11/2013 |
| EP | 2692553 A1 | 2/2014 |
| IT | 2007000101 A1 | 11/2008 |
| WO | 2009/138322 A1 | 11/2009 |
| WO | 2012/052970 A1 | 4/2012 |

OTHER PUBLICATIONS

First Office Action dated May 27, 2017 issued in Chinese Patent Application No. 2015102909583 (with English language translation).

Manual; "High Performance Tire Changer Operation Instructions"; Brand: JohnBean; Model No. EEWH553AE; URL:http://www.snaponequipment.com/ProductInfo/models.asp?category=wh&brand=John%20Bean&model=EEWH553AE; 2013; total 27 pages; Snap-on Equipment.

Operator's manual; "Electro Pneumatic Roller-Type Tire Changer"; Brand: JohnBean; Model No. EEWH535A URL:http://www.snaponequipment.com/ProductInfo/models.asp?category=wh&brand=John%20Bean&model=EEWH535A; Nov. 2011; total 89 pages; Snap-on Equipment.

* cited by examiner

METHOD FOR MOUNTING AND DEMOUNTING A TYRE TO AND FROM A WHEEL RIM

The present invention relates to a method for mounting a tyre on a rim of a vehicle wheel and/or for demounting a tyre from a rim of a vehicle wheel, in which a mounting/demounting device is supported by a post of a tyre mounting/demounting machine and is movable at least in a first direction, which is substantially parallel with respect to a rotational axis of the vehicle wheel, and in a second direction, which is substantially perpendicular with respect to said rotational axis of the vehicle wheel. The invention further relates to a tyre mounting/demounting machine for mounting a tyre to or demounting a tyre from a rim of a vehicle wheel.

In practice, tyre mounting/demounting machines are known for mounting a tyre to or demounting a tyre from a rim of a vehicle wheel which comprise a wheel support having a shaft and clamping means for rotatably and reversibly holding a rim of a wheel from which a tyre is to be demounted or to which a tyre is to be mounted during the mounting/demounting procedure. Mounting and demounting tools being provided on one or several tool carrier arms, are supported at at least one tool support post along which the one or several tool carrier arms can be moved. The tools can include bead breakers for loosening the tyre bead from the rim edge. Moreover, the tools can also comprise a removal tool for gripping and moving the tyre bead of the tyre to be demounted out of the rim.

Conventionally, each of the tool carrier arms is provided with one mounting tool, one demounting tool or an upper and a lower bead breaker tool. In theses cases, the tyre mounting/demounting machines are provided with a large number of tool arms which has to be controlled commonly or separately, respectively. Such tyre mounting/demounting machines are of a complex design and require an increased control effort.

Moreover, in case that a mounting tool and a demounting tool are supported by the same tool carrier arm, an increased effort of controlling is necessary, i.e. for choosing and precise positioning the respective mounting or demounting tool.

EP 1 398 184 B1 discloses a tyre demounting tool that is pivotally attached to a tool carrier arm. The demounting tool has a hook element arranged at its front end for engaging the tyre bead of a tyre to be demounted from the wheel rim.

Two piston/cylinder arrangements are provided at the tool arm for positioning and operating the demounting tool during the demounting process.

From EP 1 714 807 B1, a demounting tool is known which comprises a plate-shaped tool member for engaging into the space between the wheel rim and the tyre bead wherein the tool has a hook at its front end. The tool member is pivotally coupled to a tool carrier arm by an intermediate element to enable a linear as well as a pivotal movement of the tool member during the demounting process.

In EP 2 692 553 A1, a hook-shaped tyre demounting tool for demounting a tyre from a rim is disclosed which is pivotally attached by its one end to a tool carrier arm. Its other or free end provided with a hole, faces towards the tyre to be demounted from the rim. In an insertion position, the free end of the demounting tool is brought into a position, in which it abuts against the wheel rim edge close to the tyre bead, and is inserted between the tyre and the wheel rim. During the further demounting process, the tool is initially guided by the rim and pivots into an extraction position after the whole of the tool has passed the tyre bead. After the demounting process, a returning spring pivots the tool back into the insertion position.

These known demounting tools are of complex design which includes a large number of parts and/or separate drives for actuating them. Moreover, these known devices do not allow both, mounting and demounting of a tyre to or from a wheel rim. Additionally, in particular in the device of EP 2 692 553 A1, the hook-shaped end of the demounting tool has to be brought into an accurate position relative to the wheel rim edge in order to avoid that the tool pivots uncontrolled. In particular, the tool has to be brought in a position very close to the rim so that the side surface of the tool facing to the rim cannot pivot in the direction to the rim. Due to the close position of the tool related to the rim edge, the tool abuts to the rim in case that a moment acts on the tool which pivots the tool in the direction of the rim. Thus, a very precise control is needed for this known demounting tool which leads either to additional time in case that the tool is positioned by an operator, or to increased efforts for the controlling unit in case the tool is positioned by a machine.

A further tool is disclosed in EP 2 524 821 A1. The tool comprises an elbow lever arrangement having a tie rod, which functions for lifting the tool, when the tool comes in contact with the tyre bead for demounting the tyre from the wheel rim. However, this tool is rather complex and is only able for demounting a tyre rim and also necessarily in contact with the rim, when in the demounting operation.

U.S. Pat. No. 8,387,675 discloses a tyre changing machine with automated tyre bead pressing devices, controls and methods. The machine comprises a plurality of two tyre mounting tool devices which are all fully controlled by a control unit, the plurality of bead pressing devices are mounted for rotation about a first rotational axis, the first rotational axis being coincident with the drive axis as the wheel rim is rotated thereabout in a tyre changing procedure. Even though, this device is fully automatically controlled, it has different drawbacks, for example it is very complex in construction and in controlling.

A similar device is disclosed in U.S. Pat. No. 8,613,303. Additional to the above-mentioned tyre changing machine, the machine disclosed in U.S. Pat. No. 8,613,303 incorporates a force sensor providing a feedback signal indicative of at least a measure of a varying amount of force applied by the at least one component tool to said wheel assembly during a tyre change procedure. This tyre changer machine also is rather complicated and uses a sophisticated controlling mechanism.

Thus, it is an object of the present invention to provide a method for mounting a tyre on a rim of a vehicle wheel and/or for demounting a tyre from a rim, which is simple and needs less control efforts, and to provide a tyre mounting/demounting machine, which is of a simple construction and which needs less control efforts and is able to carry out the method.

According to the present invention and for solving the above identified technical problem, there is provided a method for mounting a tyre on a rim of a vehicle wheel and/or for demounting a tyre from a rim of a vehicle wheel of the aforementioned type, comprising the steps of:
  determining an initial reference position for the mounting/demounting device, said initial reference position being proximal to an edge of the wheel rim;
  linking the position of the mounting/demounting device with the initial reference position;
  adjusting the position of a mounting/demounting device with respect to either the first or the second direction;

continuously detecting the position of the mounting/demounting device with respect to said either first or second direction; and continuously and automatically adjusting the position of the mounting/demounting device, with respect to the other one of said either first or second direction, at least in dependence of the initial reference position.

The invention starts from the idea that an exhaustive and holistic control is not always necessary and a simple control mechanism leads to much more simple machines, which are more robust to failure and cheaper to produce. The inventive method therefore starts from the idea that it is sufficient to provide a certain degree of automation. The inventive method starts with the step of determining an initial reference position for the mounting/demounting device, said initial reference position being proximal to an edge of the wheel rim. This initial reference position is the starting position for the mounting/demounting device, thus preferably radially outwardly, but proximal to an upper edge of the rim, when the rim is in a mounted position at a tyre mounting/demounting machine. After determining this initial reference position, this position is linked with the position of the mounting/demounting device. Thus, the relative position of the mounting/demounting device and the initial reference position are known. After this step, the position of the mounting/demounting device is being adjusted with respect to either the first or the second direction. The mounting/demounting device is preferably only movable in the first and second directions, hence substantially parallel with respect to a rotational axis of the vehicle wheel and perpendicular with respect to the rotational axis of the vehicle wheel, preferably radial to the vehicle wheel. This step can be carried out manually by means of a joystick alley control panel or by hand or also automatically by control unit which adjusts the mounting/demounting device to move to the initial reference position. During this step, according to the invention, the position of the mounting/demounting device is continuously detected with respect to the first or second direction, thus the direction which is being adjusted.

Furthermore, the inventive method comprises the step: continuously and automatically adjusting the position of the mounting/demounting device, with respect to the other one of said either first or second direction, at least in dependence of the initial reference position. This step is carried out automatically. Thus, when for example a user adjusts the position of the mounting/demounting device with respect to the first direction, the position of the mounting/demounting device with respect to the second direction is adjusted continuously and automatically. Dependent on the initial reference position, it is possible to continuously and automatically adjust the position of the mounting/demounting device, so that in cooperation with the preferably manual adjustment of the position of the mounting/demounting device in the other of the first and second directions, a tyre is mounted on a rim or demounted from a rim.

According to the inventive method the position of the mounting/demounting device with respect to the other one of said either first or second direction is additionally adjusted with respect to said either first or second direction. According to this embodiment, the position of a mounting/demounting device is continuously and automatically adjusted with respect to the other one of said either first or second direction in dependence on the initial reference position and dependent on the actual position which is continuously detected and thus dependent on how the position of the mounting/demounting device is adjusted with respect to either the first or second direction. Thus, for example, an operator could simply command the vertical direction of the mounting/demounting device via for example a joystick, whereas the horizontal direction of the mounting/demounting device is automatically adjusted. Thus, when starting from the initial reference position, which is proximal to an edge of the wheel rim, the operator may move the joystick to move the mounting/demounting device downwards to push the tyre bead, and at the same time, the horizontal direction of the mounting/demounting device is adjusted, so that the tool moves around the wheel rim edge to move into the rim channel and touch the tyre bead to pull it off the rim. The operator does not need to pay attention to the horizontal direction of the mounting/demounting device and can fully concentrate on the vertical direction. Therefore, the control of a tyre mounting/demounting machine is very simple and easy to operate.

According to a first preferred embodiment of the invention, the method further includes that the position of the mounting/demounting device with respect to the other one of said either first or second direction is additionally continuously and automatically adjusted with respect to said either first or second direction. According to this embodiment, the movement of the mounting/demounting device is fully automatically carried out and the position of the mounting/demounting device is continuously and automatically adjusted based on the initial reference position in both, the first and second directions. According to this embodiment, the operation for the operator is even more simplified and the operator does not have to adjust any of the first or second directions.

Furthermore, it is preferred that the determined initial reference position is stored in a storing device. By storing the determined initial reference position in a storing device, the initial reference position may be used for adjusting the position of the mounting/demounting device of the operating step, so that the mounting/demounting device is again positioned at the initial reference position. Furthermore, a specific tool or specific first and second tool of the mounting/demounting device may be positioned subsequently at the initial reference position to carry out different operation steps.

In a further preferred embodiment, the step of continuously and automatically adjusting the position of the mounting/demounting device is carried out by means of a control unit. Such a control unit may be part of the mounting/demounting machine. Such a control unit may comprise a microcontroller or any other computer means and may be connected to pneumatical or hydraulical actuators of a tyre mounting/demounting machine or the mounting/demounting device. The controller may comprise software means which are programmed so that, when carried out, a tyre mounting/demounting machine comprising a mounting/demounting device of the above-mentioned type carries out the steps of the inventive method according to this invention. The software means preferably enable the automatic positioning of the tool, in dependence of the initial reference position and/or the other one of the either first or second direction. The wheel support is kept fixed and the movement is confined to the mounting/demounting tool. Preferably the mounting/demounting device is continuously and automatically adjusted to the other one of said either first or second direction according to a specific, preloaded tool movement profile that is stored in the control unit. Such a preloaded tool movement profile may comprise for each value (e.g. in terms of x or y position) of the mounting/demounting device in said either first or second position a corresponding value for the other one of said first and second position. Thus, as an example for each axial position of the mounting/demounting device relative to the initial reference position and with respect to the rotational axis of the wheel, the preloaded tool movement profile provides a corresponding radial position for the mounting/demounting device, wherein the axial and radial position is measured with respect to the rotational axis of the wheel. According to the invention, the position of the mounting/demounting device is continuously and automatically adjusted, with respect to the radial position in this example, in dependence on the initial reference position and the axial position. Preferably a plurality of such profiles is provided for the control unit. The profile or profiles may be prestored in the machine or obtainable upon request from a remote server. Each profile preferably relates to a different wheel/tyre combination. Such an embodiment enables even more accurate placement of the mounting/demounting device. The operator may choose such a wheel/tyre combination on a menu of a display device and the controller may load the corresponding profile from a memory device or a remote server.

Moreover, it is preferred that the initial reference position for the mounting/demounting device is determined through a mechanical feeler arm. Such a feeler arm can be mounted proximal to an operating portion of the mounting/demounting device and come in contact with either the tyre or the rim for determining the position. The mounting/demounting device may be moved manually to the initial reference position and when the feeler arm contacts the rim edge, the initial reference position is stored in the storing means, as described above.

Alternatively, the initial reference position for the mounting/demounting device is determined through optical means. Such optical means may include a laser scanner, which screens the rim and tyre and determines the initial reference position. In such a case, the mounting/demounting device may be automatically moved to the initial reference position. For example, suitable optical means are disclosed in EP 1 515 129 A1 and a method for determining the position is disclosed in EP 2 110 170 B1, the disclosure both is incorporated by reference herein.

In a further alternative, the initial reference position for the mounting/demounting device is manually selected by an operator. This can be done in that the operator moves the mounting/demounting device manually to the position, or the operator obtains pre-determined and pre-memorized values, which are present in a memory device and represent specific rim tyre combinations, which are known in the art. The operator may choose such a wheel tyre combination on a menu of a display device and the controller may load the corresponding initial reference position from such memory device and automatically move the mounting/demounting device to the initial reference position.

According to a further development of the invention, the mounting/demounting device comprises a bead breaker. Preferably, the mounting/demounting device comprises two bead breakers, one for the upper bead and one for the lower bead, with respect to a wheel mounting horizontal position at the tyre mounting/demounting machine.

In a further preferred embodiment, the mounting/demounting device comprises a first mounting/demounting tool unit, comprising a tool carrier arm having a center line and a first as well as a second end, and a mounting/demounting tool having a first as well as a second end, and a hook arranged in the region of the second end, and being pivotally mounted to the tool carrier arm in the region of its first end, wherein means for reversibly urging the mounting/demounting tool in a resting operating position and for positioning the mounting/demounting tool in said resting operating position are provided.

It has to be noted that the tool carrier arm may have any suitable design. In an advantageous embodiment, the tool carrier arm has at least a longitudinal extension. This longitudinal extension enables the tool carrier arm to bridge a possible distance between the support of the tool carrier arm on a respective tyre mounting/demounting machine and the support for a wheel to be treated.

Moreover, due to the fact that the mounting/demounting tool of the first mounting/demounting tool unit is reversibly urged in a resting/operating position by the means for reversibly urging the mounting/demounting tool in a resting/operating position and for positioning the mounting/demounting tool in said resting/operating position, a very effective, but simple construction for the first mounting/demounting tool unit as well as a simple control for the tool can be reached. Due to the fact that the mounting/demounting tool is held in position by the means for reversibly urging the mounting/demounting tool in a resting/operating position and for positioning the mounting/demounting tool in said resting/operating position, there is no need to position the tool at a specific location like it is necessary for the dissembling tool of EP 2 692 553 B1. In case that a moment acts on the tool which would causes a pivot movement of the tool in the direction to the tyre or rim, respectively, the means for reversibly urging the mounting/demounting tool in a resting/operating position and for positioning the mounting/demounting tool in said resting/operating position avoid a rotation movement in this direction. On the other hand, a rotation movement in the other direction, i.e. in the direction toward the tool carrier arm, can still be carried out so that the tool can grip the tyre bead as soon as the tool has passed the tyre bead during its movement toward the center plane of the rim. The pushing force being necessary for removing the tyre bead from the rim edge is established by the means for reversibly urging the mounting/demounting tool in a resting/operating position and for positioning the mounting/demounting tool in said resting/operating position by which the mounting/demounting tool is held in the resting/operating position and secured against rotational movement in a direction contrary to the moving direction towards the tyre/rim. When the tool carrier arm is further moved in the direction parallel to the rotational axis of the tyre, then the mounting/demounting tool can be pivoted in the direction to the tool carrier arm so that any damage of the rim edge can be avoided, and the hook of the mounting/demounting tool is able to grip the tyre bead after the tool has passed the tyre bead. Furthermore, due to the support of the mounting/demounting tool restricting its rotational movement in the resting/operating position, the mounting/demounting tool can also be used during a mounting operation for urging the tyre bead below the rim edge of a rim.

It has to be noted that means for reversibly urging the mounting/demounting tool in a resting/operating position and for positioning the mounting/demounting tool in said resting/operating position can be designed in different embodiments. For example, the means for reversibly urging the mounting/demounting tool in a resting/operating position and for positioning the mounting/demounting tool in said resting/operating position can be designed as tensioning and portioning means. In the following, various designs are explained in greater detail.

Furthermore, it has to be noted that the design is independent from the orientation of the rim from which a tyre is to be demounted or to which a tyre is to be mounted, i.e. the rim can be clamped to a shaft of a wheel support such that the center plane of the rim is arranged horizontally or vertically or any other orientation between a horizontal and a vertical plane, respectively.

The means for reversibly urging the mounting/demounting tool in a resting/operating position and for positioning the mounting/demounting tool in said resting/operating position can in principle be designed in two different ways: The functionality of the means for reversibly urging the mounting/demounting tool in a resting/operating position and for positioning the mounting/demounting tool in said resting/operating position can be combined in one type of machine element or machine part, respectively. For example, a tensioning element can be provided which holds the mounting/demounting tool in the resting/operating position. If, for example, the tensioning element is a spiral wound tension spring, the resting/operating position is defined by this spiral wound tension spring in its fully compressed state. Due to this, a rotation movement of the mounting/demounting tool in a direction toward the rim is avoided. However, a rotation movement in the other direction, i.e. in the direction toward the tool carrier arm is still possible. When the tensioning element is tensioned during the rotating movement of the mounting/demounting tool for gripping the tyre bead, the mounting/demounting tool moves back in the resting/operating position by the means for reversibly urging the mounting/demounting tool in a resting/operating position and for positioning the mounting/demounting tool in said resting/operating position after the tyre bead has been demounted from the rim.

The tensioning element can have a first and a second end, wherein the first end is attached to the tool carrier arm and the second end is attached to the mounting/demounting tool. This allows a very compact design of the first mounting/demounting tool unit.

It has to be noted that in case that the functionality of tensioning and positioning of the means for reversibly urging the mounting/demounting tool in a resting/operating position and for positioning the mounting/demounting tool in said resting/operating position is combined in one type of machine element, it is in principle possible that several machine elements of the same type can be provided. For example, several tensioning elements can be provided as the means in order to fulfil the tensioning and positioning functionality.

In a second principle way, the functionality of tensioning and positioning of the means for reversibly urging the mounting/demounting tool in a resting/operating position and for positioning the mounting/demounting tool in said resting/operating position can be split in at least two types of machine elements. In other words, there can be provided a first machine element for the tensioning functionality of the means for reversibly urging the mounting/demounting tool in a resting/operating position and for positioning the mounting/demounting tool in said resting/operating position, and a second type of machine element for carrying out the positioning functionality of the means for reversibly urging the mounting/demounting tool in a resting/operating position and for positioning the mounting/demounting tool in said resting/operating position. In a preferred embodiment for this principle way, the means for reversibly urging the mounting/demounting tool in a resting/operating position and for positioning the mounting/demounting tool in said resting/operating position include positioning elements which are provided at the tool carrier arm and the mounting/demounting tool, and a tensioning element which is attached to the tool carrier arm and the mounting/demounting tool.

In this configuration, the positioning elements determine the resting/operation position of the mounting/demounting tool, and secure the mounting/demounting tool against further rotation. For carrying out the tensioning functionality, at least one tensioning element as a part of the means for reversibly urging the mounting/demounting tool in a resting/operating position and for positioning the mounting/demounting tool in said resting/operating position can be provided. The tensioning element, in the resting/operating position, necessarily has to be in its relaxed state, for not providing additional tension to the mounting/demounting tool. Alternatively, an elastic tensioning element may comprise means for restricting further compression, like a sleeve covering said elastic element, or a suitable bolt. It has further to be noted that the tensioning element may not necessarily be an elastic element. The tensioning function may also be executed by other elements, like a counter weight which is coupled to the mounting/demounting tool for urging the mounting/demounting tool in the resting/operating position.

According to a further embodiment of the first mounting/demounting tool unit, the tool carrier arm may be provided with a tool support surface as a first positioning element, and the mounting/demounting tool may have a counter-support surface as a second positioning element in the region of its first end, wherein the tool support surface and the counter-support surface form the positioning elements such that, in the resting/operating position, the counter-support surface of the mounting/demounting tool is in engagement with the tool support surface of the tool carrier arm. Additionally, the positioning elements of this embodiment also restrict the rotation of the tool, particularly, secure the mounting/demounting tool in the resting/operating position against further rotation in a direction contrary to the moving direction of the tool towards the tyre/rim.

In this very effective, but simple construction for the first mounting/demounting tool unit, the pushing force being necessary for removing the tyre bead from the rim edge is established by the counter-support surface of the mounting/demounting tool which is an engagement with the tool support surface of the tool carrier arm when in the resting position, and which also forms an operating position of the mounting/demounting tool.

For the pivoting movement, it is advantageous that the tool carrier arm includes at its second end a pivot axis the center line of which extends vertically to the center line of the tool carrier arm and around which the mounting/demounting tool can reversibly pivot. In principle, it is also possible that the mounting/demounting tool is provided with a shaft which is rotatably seated in the tool carrier arm. The shaft has then the same orientation as the pivot axis mentioned previously.

According to a further preferred arrangement, the second end of the tool carrier arm is provided with a fork or clevis, respectively, having a first as well as a second tine or prong, respectively, and a fork base connecting the tines, wherein the mounting/demounting tool is at least partially arranged pivotally in the space defined by the tines and the fork base. The tines as well as the fork base define a space being open in the direction of the second end of the tool carrier arm and in a direction extending vertically thereto. This design allows a compact construction of the first mounting/demounting tool unit. Although the mounting/demounting tool is guided by the pivot axis during its pivoting movement at least one of the surfaces of the tines facing to each other, can be used as an additional guiding means for guiding the mounting/demounting tool during its pivoting movement.

Additionally or independent from the foregoing, the mounting/demounting tool can be provided at its first end with a fork or clevis, respectively, with two tines or prongs, respectively, wherein the prongs of this clevis can be formed by projections being part of the mounting/demounting tool. The prongs of the clevis of the mounting/demounting tool can be arranged such that they define a second space being open in the direction of the first end of the mounting/demounting tool and in a direction which extends vertically when the tool carrier arm and the mounting/demounting tool are mounted to each other. Thus, both pairs of tines or prongs of the mounting/demounting tool and the tool carrier arm overlap each other for some extent so that the two forks or clevis, respectively, defined by the pair of tines of tool carrier arm and by the pair of projections of mounting/demounting tool interlock or mesh with each other.

For further supporting the compact design of the first mounting/demounting tool unit, it is preferred that the counter-support surface of the tool carrier arm is arranged in the region of the fork base. In particular, the counter-support surface of the tool carrier arm can extend from the edge of the fork base in the direction of the first end of the tool carrier arm.

For providing in an easy way the counter-support surface of the mounting/demounting tool, it is of advantage when the mounting/demounting tool has at its first end at least one projection at which its counter-support surface is arranged such that it faces towards the tool support surface of the tool carrier arm when both components are assembled to each other. Thereby, the tool support surface can be designed such that a relatively large engagement area is defined between the counter-support surface of the mounting/demounting tool and the tool support surface of the tool carrier arm.

Additionally or independently from the foregoing, a second projection can be provided at the mounting/demounting tool in the region of its first end such that this projection will come in contact with the tool carrier arm on the opposed side of the tool support surface. This projection can be used as an abutment for the pivoting movement of the mounting/demounting tool starting from its resting/operating position.

In order to avoid a possible damage of the rim edge of the wheel, it is of advantage when the second end of the mounting/demounting tool is part of an extension of the mounting/demounting tool in the form of an at least slightly curved finger the tip of which is directed at least substantially in the facing direction of the counter-support surface of the mounting/demounting tool. In case that the mounting/demounting tool pivots from its resting/operating position in the direction of its second end or the finger tip, respectively, this design allows a passing of the second end of the mounting/demounting tool at the rim edge without the risk of any damage of said rim edge.

Additionally or independent from the foregoing, it is of advantage when the mounting/demounting tool is provided at its second end with at least one auxiliary guiding surface having a flat design facing away from the tool arm, i.e. in the direction of the wheel to be operated. This flat auxiliary guiding surface can slightly pass along the rim edge without producing a high contact pressure between the mounting/demounting tool and the rim edge in case that the mounting/demounting tool comes accidently or willingful in contact with the rim edge of the wheel to be operated. As already stated above, one of the advantages of the present embodiment lies in the fact that there is a need for a precise positioning of the tool when the tool contacts the tyre for the demounting process. Due to the auxiliary guiding surface, a contact of the tool with the tyre close to the rim edge is possible without the risk of damaging the rim.

In a preferred embodiment, the second end of the mounting/demounting tool has a step-shaped design. Thereby, the step-shaped design can be provided on the one side of the mounting/demounting tool facing towards the wheel to be operated and/or on the side of the mounting/demounting tool facing in the direction to the tool carrier arm.

For having a safe grip of the hook, it is of advantage when the hook faces towards the tool carrier arm and the hook opening in the direction to the center line of the tool carrier arm. This step-shaped design allows the tool to pass smoothly by a preferably superimposed rotational and longitudinal movement to the rim edge when it is moved deeper inside the tyre to grip the tyre bead.

Furthermore, it is preferred that the mounting/demounting device comprises a second mounting/demounting tool unit, comprising: a carrier unit having a first as well as a second end and being provided with first support means for receiving a bead breaker tool and second support means for receiving a mounting support tool, a bead breaker tool for loosening the tyre bead from the rim edge of a wheel, having a first as well as a second end, the first end is provided with at least one bead breaker tool element and the second end is adapted to be mounted to the carrier unit via the first support means, and a mounting support tool for supporting the mounting of at least one tyre bead of a tyre to be mounted on a rim, the mounting support tool having a first as well as a second end, the first end is provided with at least one mounting support tool element and the second end is adapted to be mounted to the carrier unit via the second support means, wherein the shape of the bead breaker tool element and the shape of the mounting support tool are at least partially congruent to each other.

A second mounting/demounting tool unit according to this embodiment thereby enables to provide both, a bead breaker and a mounting support tool, on the same tool carrier arm. Thus, no additional tool carrier arm for the bead breaker is necessary, whereby the design and control amount of the mounting/demounting machine is reduced. Additionally, the least partially congruent shapes of the bead breaker tool element and the mounting support tool and/or the mounting support tool element provide sufficient supporting contact between the bead breaker tool element and the mounting support tool for preventing unintentional vertical or lateral movement during the mounting process. In an advantageous configuration, the mounting support tool in the region of its first end has a shape that is at least partially congruent to the shape of the bead breaker tool element.

In this arrangement, the support of the mounting support tool and/or its tool element by the bead breaker tool element is provided close to the first end of the mounting support tool, where the mounting support tool element is arranged. Thereby, unintentional movement of the mounting support tool element, e.g. caused by bending of the mounting support tool, may be omitted.

In a preferred embodiment of the second mounting/demounting tool unit, the mounting support tool is pivotally attached to the second support means of the carrier unit with its second end, for being reversibly pivoted between an inoperative position and an operative position.

The pivot movement is a non-complex movement and can be executed manually or automatically with a simple mechanism, whereby the control effort may be reduced.

For further reducing the control effort, e.g. by omitting an additional drive, the bead breaker tool may be fixedly attached to the first support means of the carrier unit in its operative position. Naturally, the bead breaker tool may also be removably attached to the first support means of the carrier unit. In this case, the bead breaker tool is in its operative position when mounted to the carrier arm unit, and in its inoperative position when removed from the carrier arm unit.

In an alternative embodiment, the bead breaker tool has an operative position and an inoperative position, and wherein the bead breaker tool is pivotally attached to the first support means of the carrier unit with its second end, for being reversibly pivoted between the inoperative position and the operative position.

The mounting support tool may have any suitable shape and may be realized in various designs. In an advantageous configuration, the mounting support tool has an operative position for supporting the mounting of a tyre bead and wherein the mounting support tool has in the region of its first end an engagement portion for being adapted to come at least partially into engagement with the bead breaker tool element when in its operative position. The specific shape of the engagement portion of the mounting support tool enables sufficient supporting contact between the mounting support tool and the bead breaker tool during the mounting process, prevents unintentional. e.g. lateral or vertically downward movement of the mounting support tool, and secures the mounting support tool in its operative position.

The engagement portion of the mounting support tool may have any suitable shape, which e.g. at least partially matches the shape of the bead breaker tool element. It is preferred that the bead breaker tool element has a conical shape, like a complete cone having a tip end or a truncated cone with a planar top surface, and the engagement portion of the mounting support tool has an at least approximately circular shape adapted to be engaged by the bead breaker tool element when the mounting support tool is in its operative position.

In case that the bead breaker tool element is of a conical shape, the engagement portion of the mounting support tool may have an at least approximately ring-shape which is engaged by the bead breaker tool element when the mounting support tool is in its operative position. A ring-shaped engagement portion enables a correct positioning on and a secure engagement of the mounting support tool by the bead breaker tool element.

The engagement portion may also have any other suitable shape which may be engaged by the bead breaker tool element, like a conical cap, or any suitable opening into which the bead breaker tool element may engage, like a rectangular or triangular opening. Naturally, in case that the bead breaker tool element has a shape different from the conical shape, like a cylindrical shape, also the engagement portion may have a non-conical shape at least partially matching the shape of the bead breaker tool element.

The pivot movement of the mounting support tool between an inoperative or resting position and an operative position enables a correct and easy positioning of the mounting support tool in the operative position. In this position, the engagement portion of the mounting support tool is supported by the bead breaker tool element, whereby unintentional vertical or lateral movement during the mounting process may be omitted.

For enabling the mounting of at least one of the tyre beads to the rim, and for preventing the tyre bead from being damaged, in a preferred configuration, the mounting support tool element has a guiding surface for guiding the at least one tyre bead of a tyre to be mounted on a rim.

In a specific embodiment of the second mounting/demounting tool unit, the mounting support tool element is at least approximately hook-shaped, and the guiding surface is arranged at the inner side of the hook-shaped mounting support tool element facing in the direction of the second end of the carrier unit. It has to be understood that the inner surface of the hook-shaped mounting support tool element faces away from the rim and towards the tyre to be mounted on the rim. A hook-shaped mounting support tool element enables a secure engagement and guidance of the tyre bead during the mounting process.

According to a further preferred embodiment of the second tyre mounting/demounting tool unit, the carrier unit comprises an adapter portion adapted to be mounted to a tool carrier arm of a tyre mounting/demounting machine, in particular to an already existing tool carrier arm.

Said adapter unit allows an easy and secure positioning of the second tyre mounting/demounting tool unit to the tool carrier arm of different tyre mounting and demounting machines. This means that the second tyre mounting/demounting tool unit may be provided as an accessory or upgrade assembly for existing tyre mounting machines.

According to an alternative embodiment, the carrier unit may be a part of a tool carrier arm of a tyre mounting/demounting machine. In this configuration, the control unit of the specific tyre mounting/demounting machine may be adapted to the specific embodiment of the second mounting/demounting tool unit.

According to the present invention, there may be provided a mounting support tool for supporting the mounting of at least one tyre bead of a tyre to be mounted on a rim. The mounting support tool has a first as well as a second end, the first end is provided with a mounting support tool element and the second end is adapted to be mounted to the tool carrier arm, particularly to the lower bead breaker arm of an existing tyre mounting/demounting machine. In this configuration, the mounting support tool may be provided as an upgrade part for being mounted to a tool carrier arm of an existing tyre mounting/demounting machine.

It has to be understood that the mounting support tool may be of a configuration as disclosed in conjunction with the present invention. Moreover, it has to be noted that the mounting support tool and its component belonging to it, as well as the mounting support tool assembly, all as described above, can be used independently from the second mounting/demounting tool unit described also above.

Further advantages and embodiments of the present invention will be described in the following together with the drawings listed below. The expression "left", "right", "below" and "above" used in the following description, are referred to the drawings in an alignment such that the reference numbers and the notation of the figures used, can be read in normal.

Figure 1:
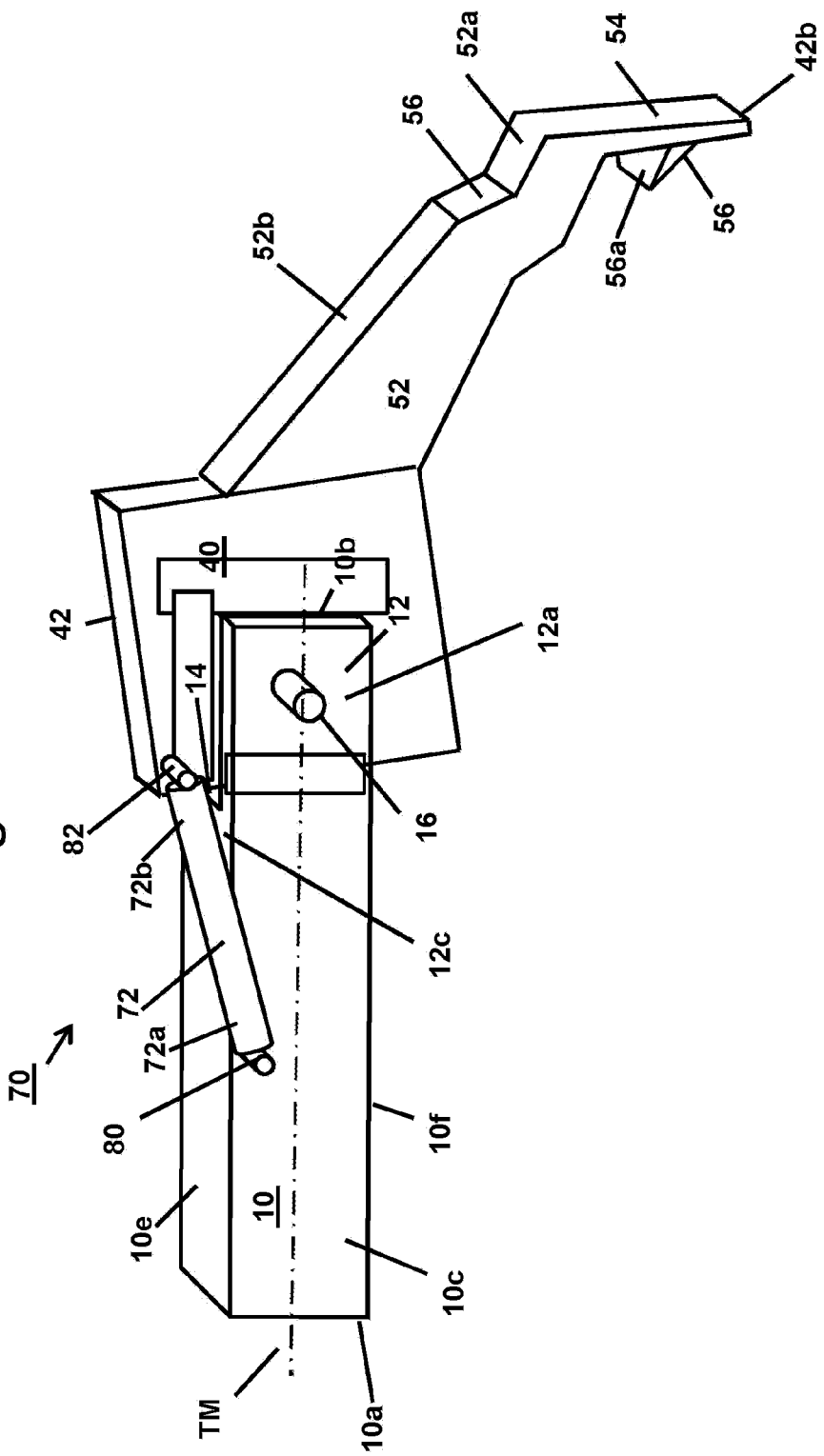
FIG. 1 is a schematic view to a first embodiment of a first mounting/demounting unit according to the present invention, shown in the resting/operating position.

The first embodiment of a first mounting/demounting tool unit U1 shown in FIG. 1 includes as main components a tool carrier arm 10, a mounting/demounting tool 40 and means 70 for reversibly urging mounting/demounting tool 40 in a resting/operating position and for positioning mounting/demounting tool 40 in said resting/operating position. As it can be seen from FIG. 1, longitudinally extending tool carrier arm 10 is arranged with its center line TM in a horizontal orientation. However, the present invention is not restricted to such an orientation of tool carrier arm 10, but it is also possible that tool carrier arm 10 is provided such that its center line TM is vertically oriented or in an angle between a horizontal and vertical orientation or plane, respectively.

Tool carrier arm 10 according to FIG. 1 is made preferably from steel and has a rectangular- or square-shaped cross-section with a first end 10*a* and a second end 10*b*. With its first end 10*a*, tool carrier arm 10 can be mounted to a drive unit (not shown) for being adapted to be movable back and forth in a direction parallel to the orientation of its center line TM. At second end 10*b*, tool carrier arm 10 is provided with a fork 12 including a first tine 12*a* as well as a second tine 12*b* and a fork base 12*c*. Tines 12*a*, 12*b* are arranged at tool carrier arm 10 such that they extend parallel to each other and define together with fork base 12*c* a first space 14 being open in the upward and downward direction, referred to FIG. 1. Moreover, a pivot axis 16 is fixed in both tines 12*a*, 12*b* such that the center line of pivot axis 16 extends vertically to the center line TM of tool carrier arm 10. As it can be seen from FIG. 1, pivot axis 16 is arranged at least substantially in the longitudinally extending center lines of respective side surfaces 10*c*, 10*d* of tool carrier arm 10 and close to second end 10*b* of tool carrier arm 10.

It is preferred that for continuously detecting the position of the tool, a sensor is arranged in the area of the pivot axis 16 for measuring a rotational position. The sensor may be connected to a control unit of the tyre mounting/demounting machine M (cf. FIG. 4 below).

Mounting/demounting tool 40 includes a tool body 42 with a first end 42*a* facing in the direction of first end 10*a* of tool carrier arm 10, and a second end 42*b* facing in the opposite direction to its first end 42*a*, i.e. in the direction of second end 10*b* of tool carrier arm 10. Tool body 42 is preferably made from steel and has a rectangular cross-section. Tool body 42 is rotatably attached to pivot axis 16.

Between tool body 42 and its second end 42*b*, an extension 52 is provided in the form of an at least slightly curved finger the tip of which forms second end 42*b* and is directed at least substantially in the facing direction of fork base 12*c* of fork 12. As it can be seen in FIG. 1, extension 52 has on its side opposite to first end 42*a* of tool body 42 an outer step-shaped contour with two steps 52*a*, 52*b*. The plane between second end 42*b* and first step 52*a* of extension 52 forms a first guiding surface 54 whereas second step 52*b* forms a second auxiliary guiding surface 55. On opposite side of second auxiliary guiding surface 55, a hook 56 is provided such that the hook opening 56*a* is directed upwardly.

According to the first embodiment, means 70 for reversibly urging mounting/demounting tool 40 in a resting/operating position and for positioning mounting/demounting tool 40 in said resting/operating position, which will further also be referred to as tensioning and positioning means 70, are formed by a tension spring in form of a coil spring 72 or a spiral wounded tension spring. Coil spring 72 has a first end 72*a* and a second end 70*b*. First end 72*a* of coil spring 72 is attached to a first holding element 80 extending from tool carrier arm 10 whereas second end 72*b* is attached to a second holding element 82 extending from tool body 42 of mounting/demounting tool 40. As shown in FIG. 1, tensioning and positioning means 70 urges mounting/demounting tool 40 in the resting/operating position. In the resting/operating position, tensioning element 72 is in its maximum compressed state as well as first and second ends 72*a*, 72*b* of coil spring 72 are in closed contact with holding elements 80, 82 such that further rotation of mounting/demounting tool 40 in counter-clockwise direction, as seen in FIG. 1, is prevented. This resting position is simultaneously an operating position such that second end 42*b* of tool body 42 or finger tip of extension 52, respectively, can be brought in contact with a tyre bead of a tyre to be demounted from a rim of a vehicle wheel in the area of the rim edge and to urge said tyre bead out of the rim edge of said wheel rim during a demounting operation. Due to the firm contact between the loops of coil spring 72 which is in its maximum compressed state, a push force can be applied to push the tyre bead out of the rim edge. It has to be noted that coil spring 72 in its maximum compressed state in this configuration is also in its maximum relaxed state, in order not to apply any additional force to mounting/demounting tool 40, which would cause further rotation of mounting/demounting tool 40.

During the further demounting operation, mounting/demounting tool 40 can carry out a pivoting movement in the clockwise direction and in a counter-clockwise direction, such that first auxiliary guiding surface 54 is substantially oriented in a vertical direction. Thereby, extension 52, and in particular hook 56, can pass the tyre bead of tyre T already separated from the rim edge of the wheel rim and hook 56 can grip the inner side of the tyre bead. Afterwards, the first mounting/demounting unit U1 can be moved upwardly, referred to FIG. 1, and can draw the tyre bead gripped by hook 56 out of the rim of wheel W. Any forces acting on mounting/demounting tool 40 can be balanced by tension element 72 of tensioning and positioning means 70 so that there is a firm contact between hook 56 and the tyre bead. Moreover, the step-shaped contour of extension 52, in particular first and second auxiliary guiding surfaces 54, 55 and step surfaces 52*a*, 52*b*, can come in contact with the rim edge and avoid thereby any damaging of said rim edge due to their plane design. After the tyre bead has been drawn out of the rim and has been detached from hook 56, mounting/demounting tool 40 returns back in its resting/operating position shown in FIG. 1.

Figure 2:
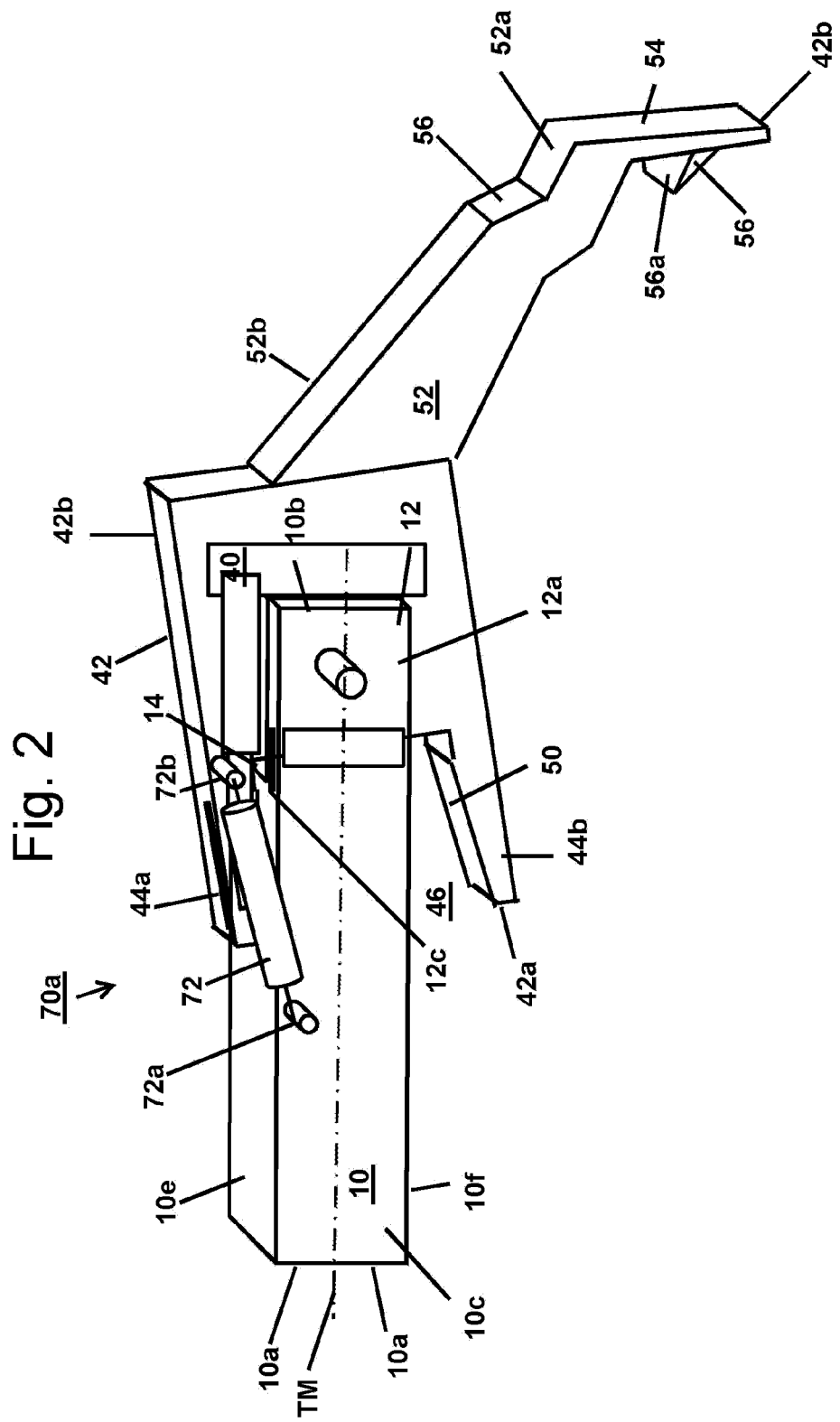
FIG. 2 is a schematic view to a second embodiment of a first mounting/demounting unit according to the present invention, shown in the resting/operating position.
Figure 3:
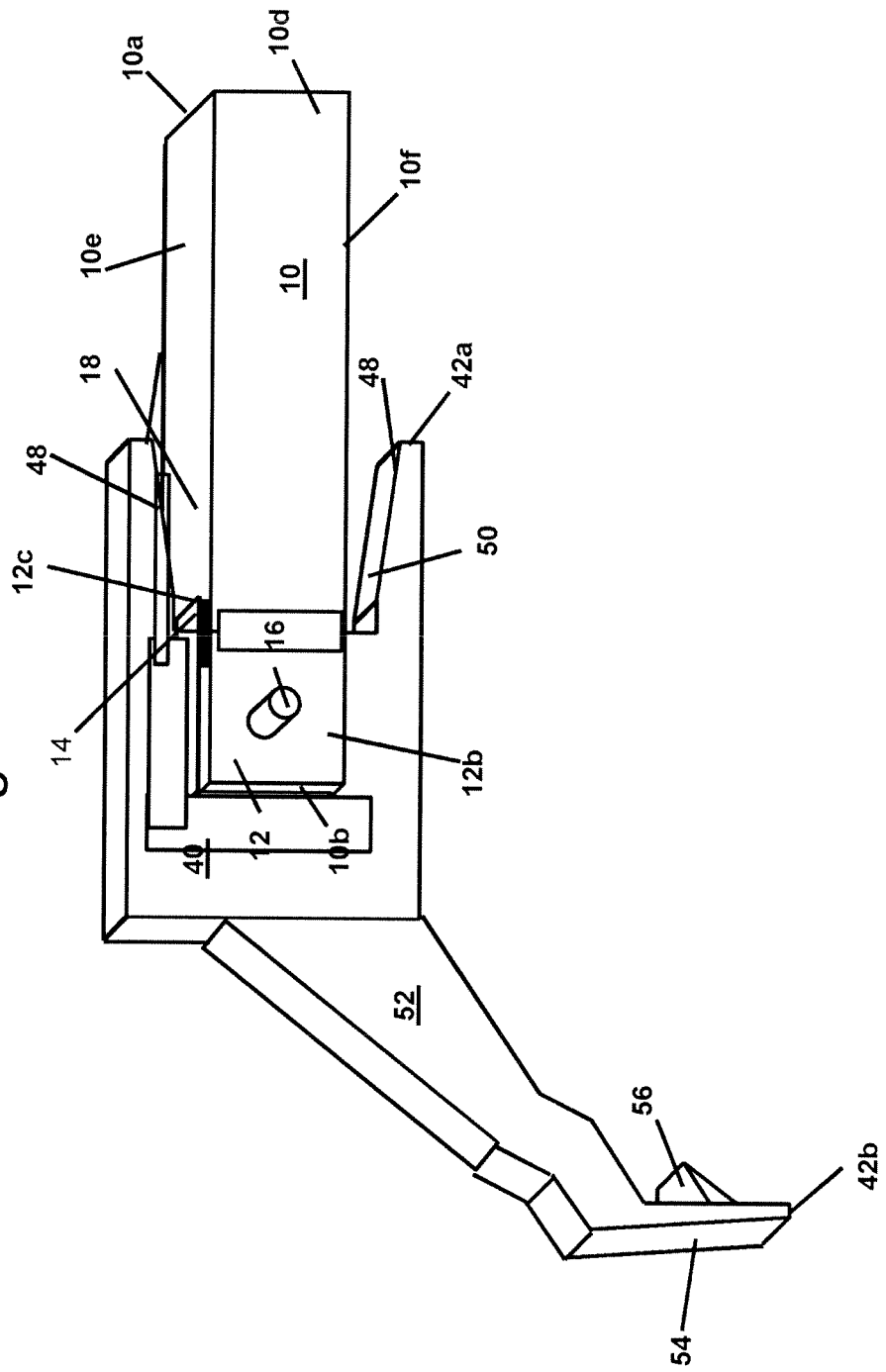
FIG. 3 is a further schematic view to the embodiment of the first mounting/demounting unit of FIG. 2, shown from the opposite side referred to FIG. 1 and in an intermediate position.

A second embodiment of the first mounting/demounting tool unit U1 shown in FIGS. 2 and 3, includes as main components again a tool carrier arm 10, a mounting/demounting tool 40 and means 70 for reversibly urging mounting/demounting tool 40 in a resting/operating position and for positioning mounting/demounting tool 40 in said resting/operating position or tensioning and positioning means 70, respectively. As it can be seen from FIGS. 2 and 3, longitudinally extending tool carrier arm 10 is arranged with its center line TM in a horizontal orientation. However, the present invention is not restricted to such an orientation of tool carrier arm 10, but it is also possible that tool carrier arm 10 is provided such that its center line TM is vertically oriented or in an angle between a horizontal and vertical orientation or plane, respectively.

With regard to the first embodiment of the first mounting/demounting tool unit U1 according to FIG. 1 and second embodiment of the first mounting/demounting tool unit U1 according to FIGS. 2 and 3, it has to be noted that identical elements of these embodiments are provided with identical reference signs.

Tool carrier arm 10 made preferably from steel, has a rectangular- or square-shaped cross-section with a first end 10a and a second end 10b. With its first end 10a, tool carrier arm 10 can be mounted to a drive unit (not shown) for being adapted to be movable back and forth in a direction parallel to the orientation of its center line TM. At second end 10b, tool carrier arm 10 is provided with a fork 12 including a first tine 12a (cf. FIG. 2) and a second tine 12b (cf. FIG. 3) and a fork base 12c. Tines 12a, 12b are arranged at tool carrier arm 10 such that they extend parallel to each other and define together with fork base 12c a first space 14 being open in the upward and downward direction, referred to FIGS. 2 and 3. Moreover, a pivot axis 16 is fixed in both tines 12a, 12b such that the center line of pivot axis 16 extends vertically to the center line TM of tool carrier arm 10. As it can be seen from FIGS. 2 and 3, pivot axis 16 is arranged at least substantially in the longitudinally extending center lines of the respective side surfaces 10c, 10d of tool carrier arm 10 and close to second end 10b of tool carrier arm 10.

On the upper side 10e of tool carrier arm 10, a tool support surface 18 (cf. FIG. 3) is provided which extends from the edge of fork base 12c in the direction to first end 10a of tool carrier arm 10. Support surface 18 forms a first element of the tensioning and positioning means 70 for fulfilling the positioning functionality. As it can be seen in FIGS. 2 and 3, tool support surface 18 is formed by upper side 10e of tool carrier arm 10. It is in principal possible that tool support surface 18 can also be formed by a defined area of upper side 10e, for example by a recession formed in upper side 10e of tool carrier arm 10 in order to hold mounting/demounting tool 40 in the resting/operating position in a defined manner.

Mounting/demounting tool 40 includes a tool body 42 with a first end 42a facing in the direction of first end 10a of tool carrier arm 10, and a second end 42b facing in the opposite direction to its first end 42a, i.e. in the direction of second end 10b of tool carrier arm 10. Tool body 42 is preferably made from steel and has a rectangular cross-section. Tool body 42 is rotatably attached to pivot axis 16.

First end 42a of tool body 42 is part of two projections 44a, 44b which extend from tool body 42 to its first end 42a. Both projections 44a, 44b define also a clevis or fork, respectively, with two prongs wherein the prongs of this clevis are formed by both projections 44a, 44b. Projections 44a, 44b are arranged such that they define a second space 46 being open in the leftward and the rightward direction, referred to FIG. 2. As it can be seen in FIGS. 2 and 3, both pairs of tines or prongs 12a, 12b; 44a, 44b overlap each other for some extent so that the two forks or clevis, respectively, defined by the pair of tines 12a, 12b of tool carrier arm 10 and by the pair of projections 44a, 44b of mounting/demounting tool 40 interlock or mesh with each other.

Upper projection 44a of tool body 42 comprises a counter-support surface 48 facing to second projection 44b of tool body 42, and in particular to tool support surface 18 of tool carrier arm 10. Counter-support surface 48 forms another element of the tensioning and positioning means 70 for fulfilling the functionality of positioning of the tensioning and positioning means 70. As it can be seen from FIGS. 2 and 3, counter-support surface 48 encloses an angle with upper lateral surface 42c of tool body 42 (and the upper lateral surface of projection 44a), in particular an acute angle. The amount of this angle defines the resting/operating position of mounting/demounting tool 40 and thus the orientation of an extension being provided between tool body 42 and its second end 42b which is used for the demounting process. Between counter-support surface 48 and tool body 42, a further part surface not designated can be provided which extends at least partially parallel to the upper lateral surface 42c of tool body 42.

Second projection 44b is inversely designed to first projection 44a. Thereby, the surface which corresponds to counter support-surface 48, forms an abutment surface 50 used for limiting the pivoting movement of mounting/demounting tool 40 from the resting/operating position in the clockwise direction, referred to FIG. 2 (or the counter-clockwise direction if referred to FIG. 3).

Between tool body 42 and its second end 42b, an extension 52 is provided, which has the same design as the extension 52 of the first embodiment described above in conjunction with FIG. 1.

For fulfilling the functionality of tensioning, tensioning and positioning means 70 include a tension spring in form of a coil spring or a spiral wounded tension spring 72. Coil spring 72 has a first end 72a and a second end 70b. First end 72a is attached to tool carrier arm 10 whereas second end 72b is attached to tool body 42 of mounting/demounting tool 40. As it can be seen in FIG. 2, tension spring 72 urges mounting/demounting tool 40 in a position in which counter support surface 48 engages tool support surface 18 so that mounting/demounting tool 40 is in a resting position. Here, in this resting/operating position, tension spring 72 is still strained in contrast to coil spring 72 of the first embodiment. This resting position is simultaneously an operating position such that second end 42b of tool body 42 or finger tip of extension 52, respectively, can be brought in contact with a tyre bead of a tyre to be demounted from a rim of a vehicle wheel in the area of the rim edge and to urge the tyre bead out of the rim edge of said wheel rim during a demounting operation. Due to the firm engagement between support surface 18 and counter-support surface 48, a push force can be applied to push the tyre bead out of the rim edge. During the further demounting operation, mounting/demounting tool 40 can carry out a pivoting movement in the clockwise direction, referred to FIG. 2 (and in a counter-clockwise direction, referred to FIG. 3) such that first auxiliary guiding surface 54 is substantially oriented in a vertical direction (cf. FIG. 3). Thereby, extension 52 and in particular hook 56 can pass the tyre bead of tyre T (cf. FIG. 4) already separated from the rim edge of the wheel rim and hook 56 can grip the inner side of the tyre bead. Afterwards, the first mounting/demounting tool unit U1 can be moved upwardly, referred to FIGS. 2 and 3, and can draw the tyre bead griped by hook 56 out of the rim of the wheel W. Any forces acting on mounting/demounting tool 40 can be balanced by tensioning and positioning means 70 so that there is a firm contact between hook 56 and the tyre bead. Moreover, the step-shaped contour of extension 52, in particular first and second auxiliary guiding surfaces 54, 55 and step surfaces 52a, 52b can come in contact with the rim edge and avoid thereby any damaging of said rim edge due to their plane design. After the tyre bead has been drawn out of the rim and has been detached from hook 56, mounting/demounting tool 40 returns back in its resting/operating position shown in FIG. 2.

In a further alternative embodiment of mounting/demounting tool 40 (not shown), extension 53 is hook-shaped including guide surface 54 and hook 56. In this embodiment, finger tip or second end 42b has been omitted. Instead of finger tip 42b, hook-shaped extension 52 is provided with a protrusion extending downwardly from the lower hook surface, and provides the same functionality as disclosed in conjunction with finger tip 42b and guide surface 54. Said protrusion may separately be attached to hook-shaped extension 52, and may be formed completely from plastic, in order to avoid damages on rim R. Naturally, said protrusion may also contain a core-part of metal with a coating of plastic.

Figure 4:
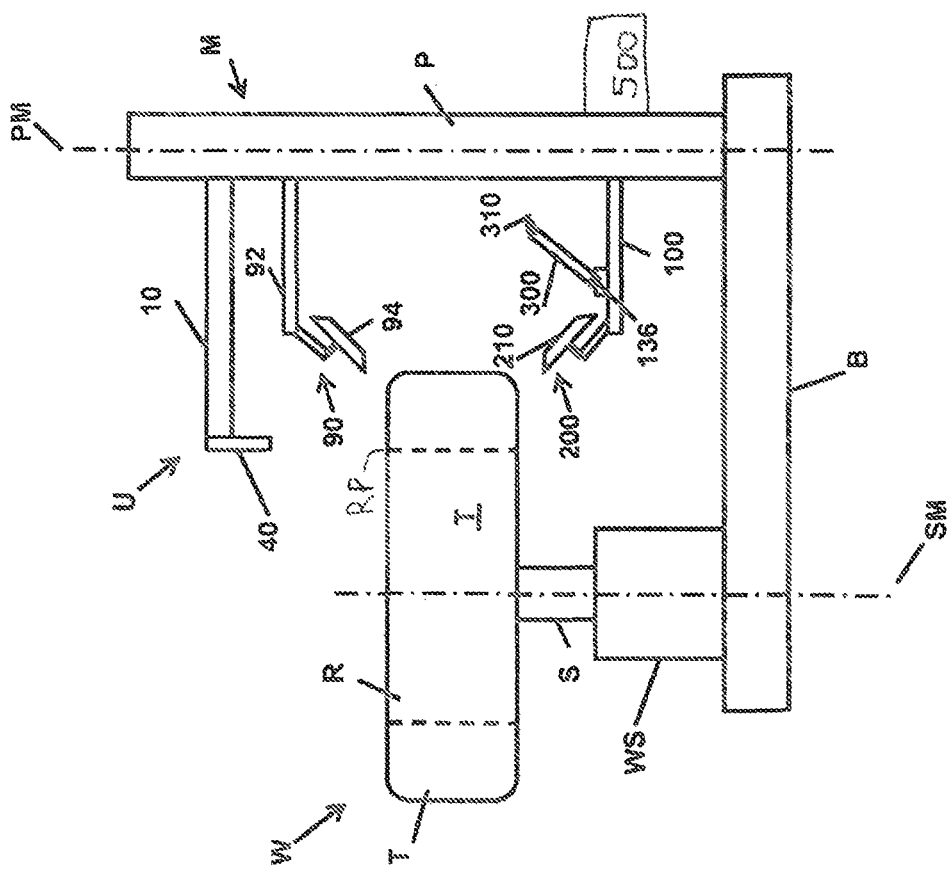
FIG. 4 is a schematic view to an embodiment of a tyre mounting/demounting machine according to the present invention.

In FIG. 4, a tyre mounting/demounting machine M according to the present invention is shown at which the inventive first mounting/demounting tool unit U1 is provided. It has to be understood that both embodiments of the inventive first mounting/demounting tool unit U1 may be used in mounting/demounting machine M.

Mounting/demounting machine M includes a machine base B and a wheel support WS with a shaft S on which a rim of a wheel W from which a tyre T is to be demounted or to which a tyre T is to be mounted, respectively, can rotatably be clamped. Wheel support WS and shaft S are arranged on machine base B such that center line SM of shaft S and wheel support WS extends vertically. The rim of wheel W clamped on shaft S, can be arranged at the free end of shaft S such that its midplane is horizontally oriented. In the casing of wheel support WS, a drive device, like an electric motor, is arranged for rotating shaft S and the rim of wheel W during the mounting and demounting procedure.

Moreover, on base B, a tool support post P is arranged such that center line PM of tool support post P extends at least substantially parallel to center line SM of wheel support WS and shaft S, respectively. Tool support post P has a horizontal distance to wheel support WS and shaft S such that a complete wheel W, i.e. including a rim R and a tyre T, can reversibly be mounted on shaft S and can freely be rotated by the aforesaid drive device without interference with support post P.

On tool support post P, inventive first mounting/demounting tool unit U1 is arranged such that tool carrier arm 10 extends at least substantially horizontal wherein, at second end 10b of tool carrier arm 10, i.e. the free end of the cantilevered arranged tool carrier arm 10, mounting/demounting tool 40 is provided. Tool carrier arm 10 can reversibly be moved along tool support post P by a not shown drive device, like an electric motor or pneumatic or hydraulic cylinder/piston device, respectively. Furthermore, tool carrier arm 10 can be coupled or can include a further drive device, like an electric motor or pneumatic or hydraulic cylinder/piston device, respectively, for at least reversibly moving mounting/demounting tool 40 in the horizontal direction. In principle, it is also possible that at least mounting/demounting tool 40 (but also a part or the whole tool carrier arm 10) can horizontally be moved by hand. Moreover, tool carrier arm 10 can pivotally be arranged at tool support post P such that tool carrier arm 10 can be pivoted in a horizontal plane wherein this pivot movement can be carried out by hand or by a drive device, respectively.

Mounting/demounting machine M includes additionally an upper and a lower bead breaker tool device 90, 200 for releasing the bead of a tyre T from the rim edge of a wheel rim. Both bead breaker tool devices 90, 200, include a bead breaker carrier arm 92, 100 extending at least substantially in the horizontal direction and being mounted to tool support post P in a cantilevered fashion. At the free ends of bead breaker carrier arms 92, 100, a bead breaker tool 94, 210 is rotatably mounted via a bar (not designated) in form of a truncated cone wherein the smaller diameter of the cone faces towards tool support post P as it can be seen in FIG. 3.

Both bead breaker tool devices 90, 200 can reversibly and independently from each other be moved along tool support post P by not shown drive devices, like electric motors or pneumatic or hydraulic cylinder/piston devices, respectively, wherein one drive devices can be provided for each of bead breaker tool devices 90, 200 or commonly for both devices 90, 200. Furthermore, bead breaker tool devices 90, 200 can be coupled or can include a further drive device, like an electric motor or pneumatic or hydraulic cylinder/piston device, respectively, for at least reversibly moving bead breaker tools 94, 210 in the horizontal direction. In principle, it is also possible that at least bead breaker tools 94, 210 (but also a part or the whole tool carrier arms 92, 100) can horizontally be moved by hand. Moreover, bead breaker carrier arms 92, 100 can pivotally be arranged at tool support post P such that both carrier arms 92, 100, or at least one of them, can be pivoted in a horizontal plane wherein this pivot movement can be carried out by hand or by a drive device, respectively.

Figure 5:
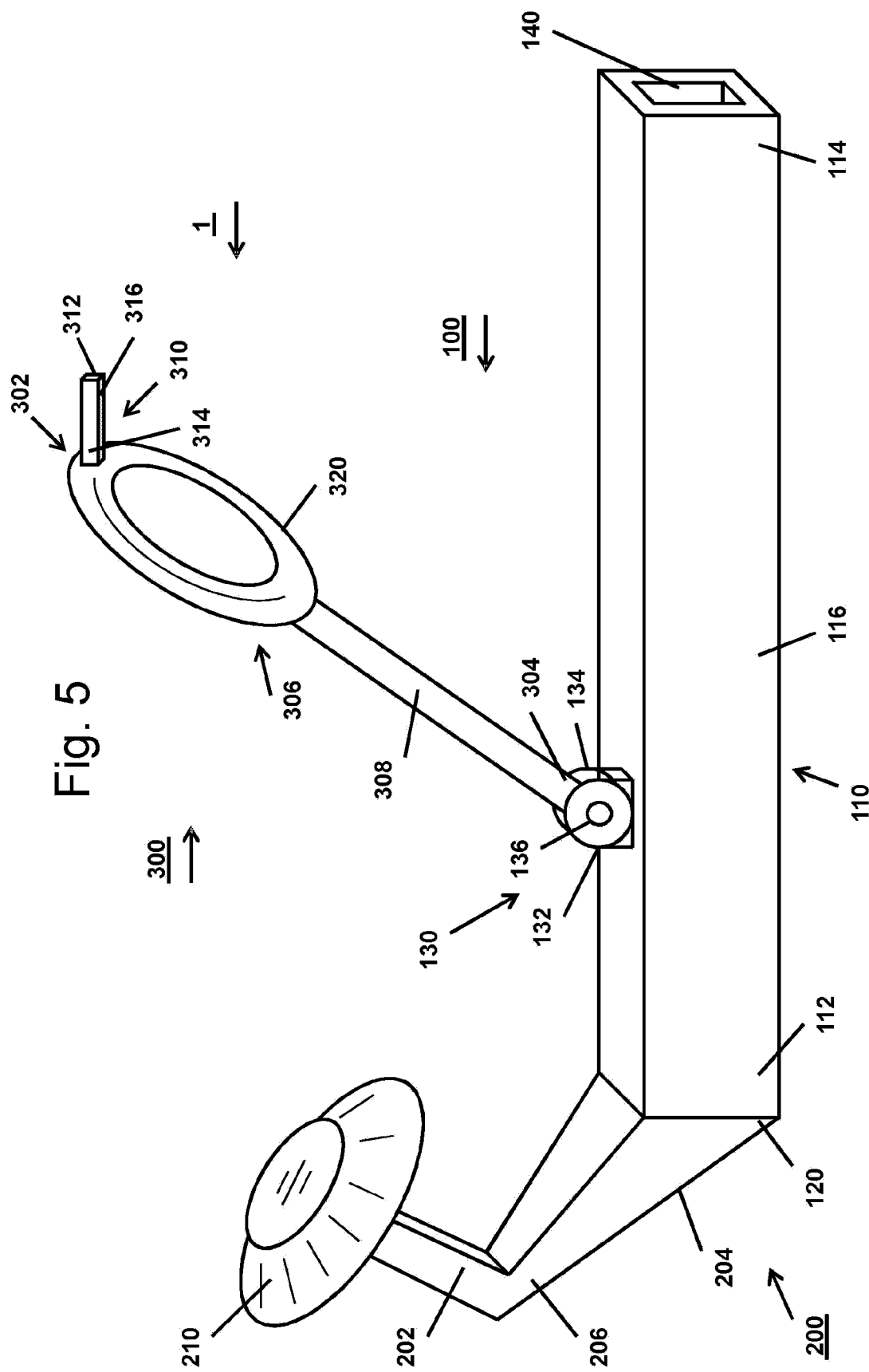
FIG. 5 is a schematic view to an embodiment of a second mounting/demounting tool unit, with an inventive mounting support tool in the inoperative position.
Figure 6:
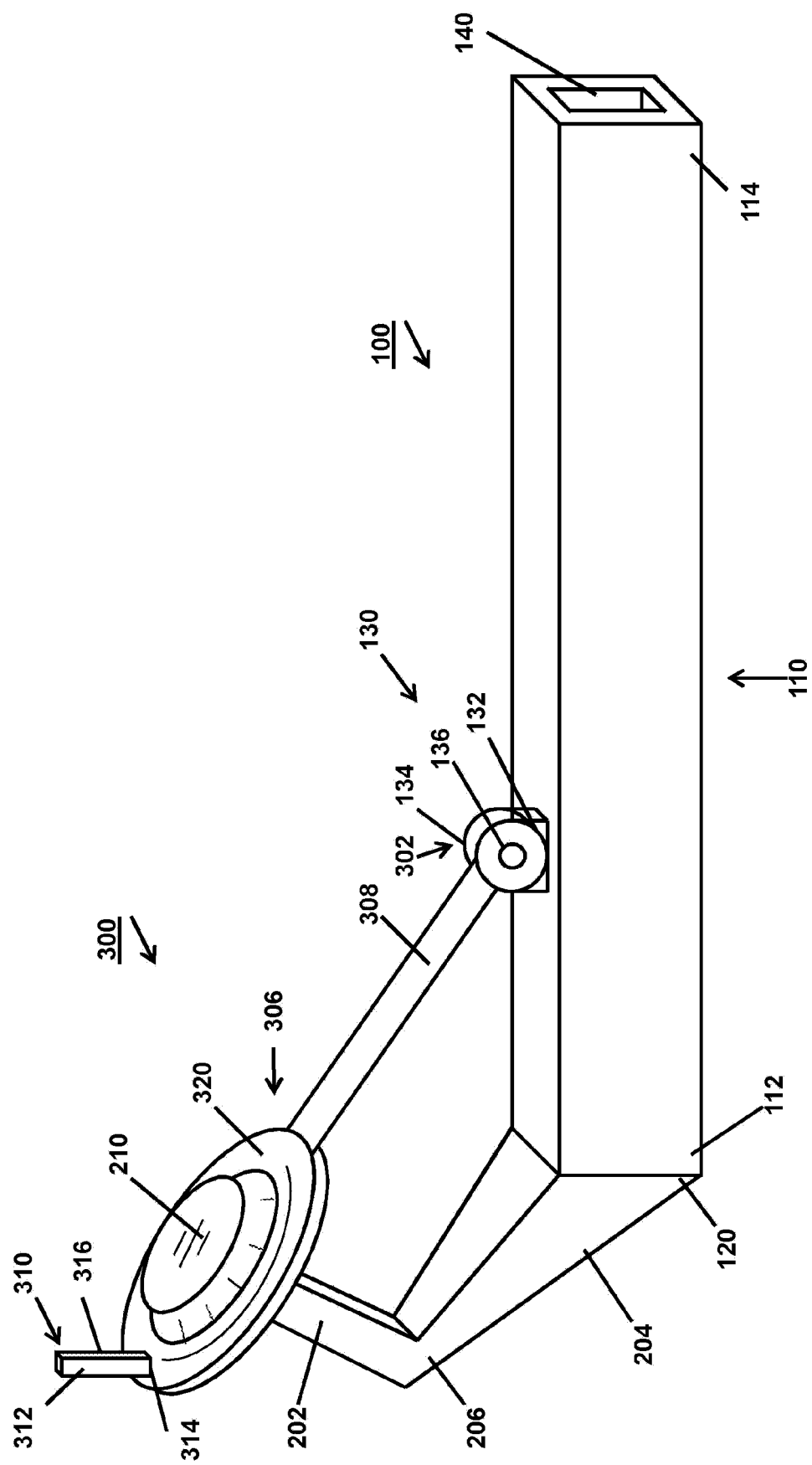
FIG. 6 is a schematic view to the embodiment of the second mounting/demounting tool unit of FIG. 5, with the mounting support tool in the operative position.

Lower bead breaker tool device 200 comprises a mounting support tool 300 which can be pivoted around a horizontally extending pivot axis 136, which may be the hinge bolt of a respective hinge, being arranged on the upper side of bead breaker carrier arm 100, from a resting position shown in FIGS. 4 and 5, in an operating position which is shown in FIG. 6 and in which mounting support tool 300 abuts closely on bead breaker tool 210. Pivot axis 136 is arranged vertically to the center line of bead breaker carrier arm 100 of lower bead breaker tool device 200.

With its lower end, mounting support tool 300 is pivotally arranged at pivot axis 136. At the opposite end, mounting support tool 300 is provided with a hook-shaped mounting support tool element 310 used for drawing the tyre bead TB of a tyre T to be mounted to a rim R of a wheel W, over the first rim edge RE, the upper rim edge RE, in the direction to the lower rim edge RE (cf. FIG. 7). For closely abutting to bead breaker tool 210, mounting support tool 300 comprises between its lower end and mounting support tool element 310 an eye ring or ring-shaped portion the inner diameter of which corresponds at least substantially to the medium diameter of the truncated cone of bead breaker tool 210. It has to be noted that the eye ring must not be completely closed, but can also be interrupted so that, for example, the truncated cone of bead breaker tool 210 is only enclosed by two-thirds of its outer diameter.

Mounting support tool 300 is used to assist the mounting procedure of a tyre T to a rim of a wheel W. For this purpose, mounting support tool 300 is pivoted from its resting position shown in FIGS. 4 and 5, to its operating position shown in FIG. 5, in which it abuts closely on bead breaker tool 210 of the lower bead breaker tool device 200. Before or subsequently, tyre T to be mounted, is placed on the rim R of wheel W such that at least a part of the lower tyre bead TB has passed upper rim edge RE of the wheel rim. Afterwards, bead breaker tool device 200 is moved upwardly along support post P and hook-shaped mounting support tool element 310 is brought in contact with the lower bead TB of tyre T. Then, bead breaker tool device 200 is moved downwardly, wherein hook-shaped mounting support tool element 310 draws lower tyre bead TB of tyre T downwardly, wherein the passing of the remaining rest of the lower tyre bead TB of tyre T can be assisted by pushing tools not shown, or by upper bead breaker tool device 90 and/or by rotating the rim R via shaft S. After the lower tyre bead TB has been drawn in its lower position close to the lower rim edge RE of wheel rim R, hook-shaped mounting support tool element 310 is decoupled from said lower bead TB and is pivoted in its resting position shown in FIGS. 4 and 5.

Mounting support tool 300 according to the embodiment of FIG. 4, may be mounted to a carrier arm 100 of a lower bead breaker tool device 200. Alternatively, a second mounting/demounting tool unit U2 may be provided, which replaces a conventional lower bead breaker tool device. An embodiment of such a second mounting/demounting tool unit U2 is disclosed in conjunction with FIGS. 5 to 7.

FIG. 5 is a schematic view to an embodiment of a second mounting/demounting tool unit U2, with a mounting support tool 300 in the inoperative position.

The second mounting/demounting tool unit U2 comprises a carrier unit 100, a bead breaker tool 200 and a mounting support tool 300. In FIG. 5, bead breaker tool 200 is in its operative position, whereas mounting support tool 300 is in its inoperative position.

As it can be seen in FIG. 5, carrier unit 100 has an at least approximately horizontally arranged carrier arm portion 110, which has a first or left end 112 and a second or right end 114, and a straight mid portion 116. Carrier arm portion 110, according to FIG. 5, has a rectangular cross section including a top surface 118, which can be made of steel.

On top surface 118 of carrier arm portion 110, a second support means 130 for receiving mounting support tool 300 is provided. Support means 130, according to this specific embodiment, is in the form of a hinge having a first hinge portion 132 which is fixedly attached to top surface 118 of carrier arm portion 110, and a second hinge portion 134 mounted to mounting support tool 300. First and second hinge portions 132, 134 of support means or hinge 130, are pivotally connected to each other by a hinge bolt 136. Hinge 130 allows a pivot movement of mounting support tool 300 about hinge bolt 136, which is at least approximately horizontally arranged and which extends in a direction approximately rectangular to the longitudinal extension of carrier arm portion 110 and vertical to a plane extending through carrier arm portion 110.

Bead breaker tool 200 for loosening a tyre bead TB from a rim edge RE of a wheel rim R has a first end 202 with a bead breaker tool element 210 in the form of a truncated cone. Bead breaker tool element or truncated cone 210 is preferably rotatable attached to first end 202 of bead breaker 200. Bead breaker tool 200 further has a mid-portion 206 between its first and second ends 202, 204. Mid-portion 206 is curved such that the upper border or edge of the outer surface of cone 210 is aligned at least approximately in a horizontal plane, with its base surface facing away from carrier arm portion 110, and its top surface facing upwardly and towards carrier arm portion 110, such that said upper border or edge comes in contact with the tyre bead TB to be loosened.

Bead breaker tool 200 has a second end 204, by means of which bead breaker tool 200 is mounted to the first end 112 of carrier arm portion 110 of carrier unit 100. According to the embodiment of second mounting/demounting tool unit U2 of FIG. 5, bead breaker tool assembly 200 is detachably mounted to first end 112 of carrier arm portion 210 by first support means 120 for reversibly accommodating bead breaker tool 200, and which comprise an insertion portion provided at second end 204 of bead breaker tool 200, which is inserted into a respective receiving portion provided on first end 112 of carrier arm portion 110 (both are not visible in FIG. 5). Naturally, bead breaker tool 200 may also be fixedly attached to the first end 112 of carrier arm portion 110 with its second end 204, e.g. by welding or the like.

In a specific configuration of second mounting/demounting tool unit U2, first support means 120 may also be realized by a hinge, wherein a first hinge member is attached to first end 112 of carrier arm portion 110 and a second hinge member is attached to second end 204 of bead breaker tool 200. Bead breaker tool 200 is then pivotally attached to carrier arm portion 110, and may be reversibly pivoted between the operative position and an inoperative position.

Mounting support tool 300 has a first end 302, a second end 304 and a mid-portion 306. Mounting support tool 300 is pivotally attached to tool carrier arm portion 110 by its first end, at which second hinge portion 134 of hinge 130 is provided, which forms second support means 130 for receiving or bearing mounting support tool 300.

Figure 7:
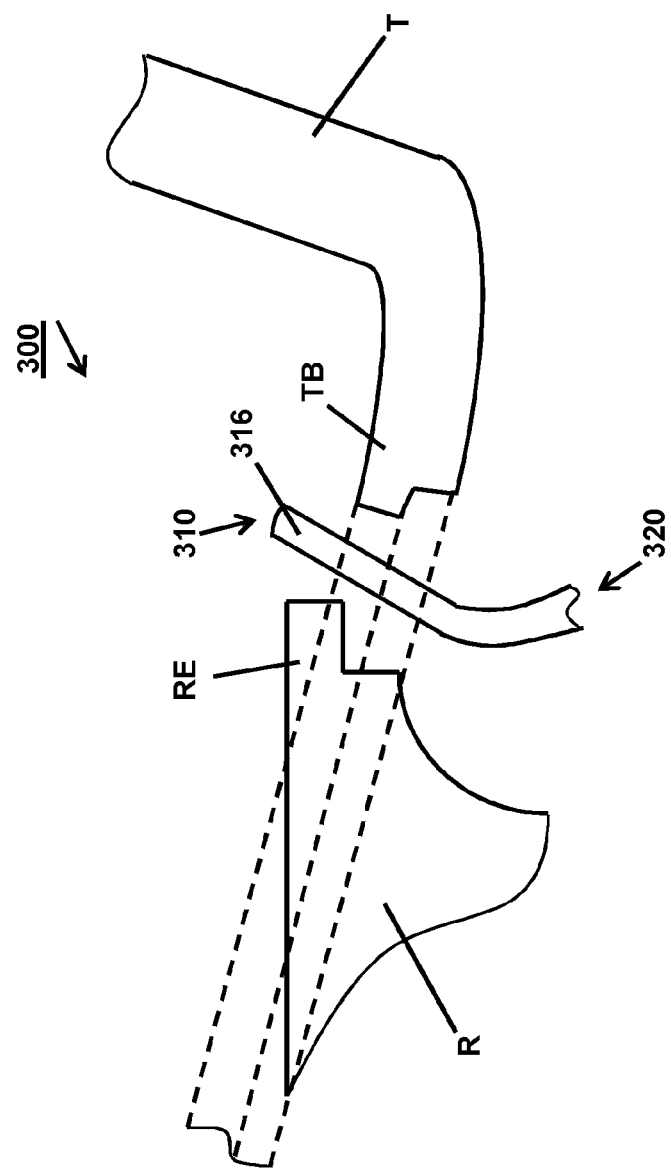
FIG. 7 is a detailed view to the mounting support tool element of the mounting support tool in the operative position.

Second end 304 of mounting support tool 300 is formed by a mounting support tool element 310 which in operation engages at least one tyre bead TB of a tyre T to be mounted, for mounting said tyre bead TB to a rim edge RE of a wheel rim R (as shown in FIG. 7). Mounting support tool element 310 has a longitudinally extending body of an at least approximately rectangular cross section, with a first end 312 and a second end 314, and a guiding surface 316 for guiding the at least one tyre bead TB of the tyre T to be mounted on the rim R. Guiding surface 316 is formed by the surface of mounting support tool element 310, facing towards tool carrier arm portion 110, when mounting support tool 300 is in its inoperative position, particularly, facing towards the second end 114 of carrier arm portion 110. Mounting support tool element 310 is attached to mid-portion 306 of mounting support tool 300 by its second end 314.

Mid-portion 306 of mounting support tool 300 includes an at least approximately ring-shaped portion 320, which forms an engagement portion being arranged close to or in the region of the second end 304 of mounting support tool 300. The circular shape of ring-shaped portion 320 is congruent to the shape of a plane through truncated cone 210 of bead breaker tool 200 and parallel to its base surface. The plane in which ring-shaped portion 320 extends, or the plane of the ring, is at least approximately rectangular aligned to a plane extending vertically through carrier arm portion 110. The size of ring-shaped portion 320, and its opening, respectively, is selected to match with the outer diameter of at least one section of bead breaker tool element or truncated cone 210 of bead breaker 200. A rod-shaped portion 308 extends between ring-shaped portion 320 and second end 304 of mounting support tool 300, the length of which is adapted to the distance between truncated cone 210 of bead breaker 200 and the position of second support means or hinge 130, such that ring-shaped portion 320 is supported by truncated cone 210 of bead breaker 200, when in the operative position (cf. FIG. 6).

Mounting support tool 300 may be made of any suitable material. It is preferred that mounting support tool 300 is made of metal. In order to avoid damages of tyre bead TB, mounting support tool element 310 may additionally be provided with a coating, e.g. of plastic.

Further according to FIG. 5, right end 114 of carrier arm portion 110 is provided with an accommodation portion 140 in the form of a blind hole having an approximately rectangular cross-section. Accommodation portion 140 extends from the outer end of second end 114 of carrier arm portion 110 into carrier arm portion 110 along its central axis. The length or depth of accommodation portion 140 corresponds to a respective insertion portion provided on the tool carrier arm of a mounting/demounting machine M, to which the second mounting/demounting tool unit U2 may be attached (cf. FIG. 4).

Naturally, respective securing elements have to be provided for securing the second mounting/demounting tool unit U2 when attached to the tool carrier arm of the mounting/demounting machine M. It is also possible that carrier arm portion 110 is provided with an insertion portion and that the tool carrier arm of the mounting/demounting machine M comprises a respective accommodation portion.

The insertion portion and the accommodation portion may have other than the above described configurations. Essentially is a form-fit coupling between the second mounting/demounting tool unit U2 and the tool carrier arm of the mounting/demounting machine M, for a correct positioning and support of the second mounting/demounting tool unit U2 on said tool carrier arm.

FIG. 6 is a schematic view of the embodiment of the second mounting/demounting tool unit U2 of FIG. 5, with the mounting support tool 300 in the operative position.

As it can be seen in FIG. 6, in its operative position, mounting support tool 300 is pivoted towards bead breaker 200, about hinge bolt 136 and in a plane extending vertically and in the longitudinal extension of carrier arm portion 110. In the operative position, truncated cone 210 of bead breaker 200 engages ring-shaped portion 320, forming an engagement portion of mounting support tool 300, and at least partially extends there trough. Ring-shaped portion 320, and thus, mounting support tool 300, is supported by bead breaker 200, when in the operative position.

As it further can be seen in FIG. 6, in the operative position, mounting support tool element 310 is arranged at ring-shaped portion 210 such that it faces upwardly, with guiding surface 316 facing towards second end 114 of carrier arm portion 110. That means that guiding surface 316 faces away from rim R to which a tyre T has to be mounted. Mounting support tool element 310 and rod-shaped portion 308 are arranged in the plane extending vertically and in the longitudinal extension of carrier arm portion 110, or in the pivot plane, but with an angle with regard to their longitudinal extension. This angle ensures the correct positioning of mounting support tool element 310 with respect to rim R and tyre bead TB of the tyre T to be mounted (cf. FIG. 7).

As it further can be seen in FIG. 6, in the operative position, ring-shaped portion 320 of mounting support tool 300 is at least approximately parallel to the base surface of truncated cone 210 of bead breaker 200, enabling a ring-shaped contact between truncated cone 210 and ring-shaped portion 320.

FIG. 7 is a detailed view to the mounting support tool element 310 of the inventive mounting support tool 300 in the operative position, and arranged closed to the rim edge RE of rim R to which tyre T has to be mounted.

Mounting support tool element 310 of mounting support tool 300 is positioned between rim edge RE of rim R and tyre bead TB of tyre T to be mounted, and in an angle relative to the vertical axis of rim R such that first end 312 of mounting support tool element 310 slopes towards tyre bead TB. Guiding surface 316 faces towards tyre bead TB of tyre T.

The length of mounting support tool element 310 and the angle between mounting support tool 310 and rod-shaped portion 308, or ring-shaped portion 320, respectively, are selected such mounting support tool element 310 is positioned at least approximately vertically above bead breaker tool element or truncated cone 210, particularly, approximately vertically above the edge of the base surface of truncated cone 210, when mounting support tool 300 is in the operative position, for enabling a correct contact between mounting support tool element 310 and tyre bead TB during the mounting operation. This arrangement of mounting support tool element 310 ensures a correct guidance of tyre bead TB for passing rim edge RE during the mounting operation without damaging tyre bead TB or rim edge RE.

For mounting at least one tyre bead TB of a tyre T on a rim R, said rim R is positioned and clamped on shaft S of wheel support WS. Thereafter, the second mounting/demounting tool unit U2 with mounting support tool 300 in its operative position as shown in FIG. 6, is moved towards the upper rim edge RE of rim R. Mounting support tool element 310 is positioned close to rim edge RE and laterally thereto. A tyre T to be mounted is placed on rim R and with a portion of its lower tyre bead TB encompassing mounting support tool element 310, as shown in FIG. 7. With tyre T in this position, rim R is rotated about its vertical axis. By rotating rim R about at least one complete revolution, the lower tyre bead TB, guided by guide surface 316 of mounting support tool element 310, is moved over upper rim edge RE of rim R. Thereafter, carrier unit 100 of the second mounting/demounting tool unit U2 is lowered for disengaging mounting support tool 300 from tyre T.

The further mounting process is executed by first mounting/demounting tool unit U1 which engages upper tyre bead TB of tyre T for urging upper tyre bead TB over upper rim edge RE of rim R. The pivot movement of mounting support tool 300 and/or bead breaker tool 200 may manually be executed, which reduces the control amount for the mounting/demounting machine M. Naturally additional drive means, like piston/cylinder drives may be provided for pivotally moving mounting support tool 300 and/or bead breaker tool 200, which may easily be integrated into an existing control device, or which may also manually be activated.

With respect to FIGS. 4 and 8 to 15 in particular a mounting and demounting procedure is described.

Figure 8:
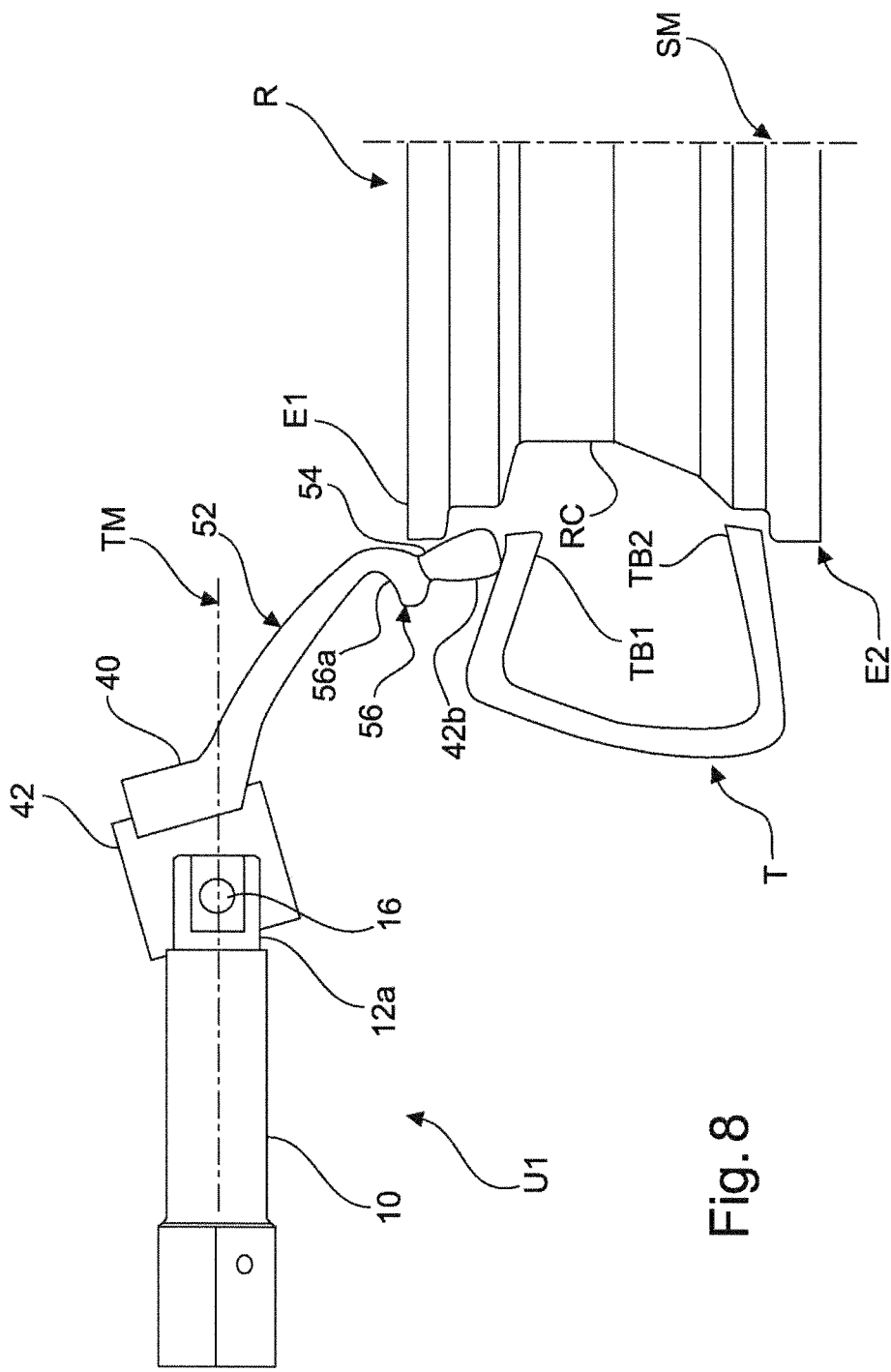
FIG. 8 is a schematic view of a first step of a demounting procedure.

Again, making reference to FIG. 4, the general structure of mounting/demounting machine M is shown. At an upper edge of the rim R, the initial reference point RP is shown. The machine M according to this embodiment comprises a controller 500 which is mounted at a backside of the post P. According to this embodiment, the initial reference point RP is determined by moving the tool 40 of the first mounting/demounting tool unit U1 of the mounting/demounting device manually to the initial reference point RP. At this point, the initial reference point is stored in a storing device arranged in the control unit 500. From now on, the demounting procedure can start. FIG. 8 shows a first step, where a demounting procedure already has started. The mounting/demounting tool unit U1 is substantially designed as the first mounting/demounting tool unit shown in FIGS. 1 to 3 and same and similar elements are depicted with identical reference signs and insofar reference is made to the above description of FIGS. 1 to 3.

The tool 40 is in a resting position, and the tool body 42 is slightly tilted upwards with respect to the pivot exit 16, so that holding element is in contact and the coil spring 72 (see FIG. 1) is in a compressed state or the upper projection 44 is in contact with the upper contact surface of the arm 10. The operator moves the first mounting/demounting unit U1 downwards, with reference to FIG. 8, for example by means of a joystick controller or the like. The second end 42b is in contact with the upper tyre bead TB1 and pushes it downwards from the upper edge E1 of the rim R. The tyre T is compressed and the tyre beads TB1, TB2 are moved together. The adjustment of the position of the mounting/demounting device, in particular here the first mounting/demounting tool unit U1 with respect to the first direction, which in this embodiment is the vertical direction parallel to the axis SM, is continued and the position of the mounting/demounting device is continuously detected by appropriate sensors provided at the post P. At the same time, the position of the mounting/demounting device, here the first mounting/demounting tool unit U1, with respect to the horizontal direction, parallel to the axis TM, is continuously and automatically adjusted. In particular, with respect to FIG. 8, the first mounting/demounting tool unit U1 is moved to the right, so that the second end 42b enters the rim channel RC for moving the hook 56 behind the tyre bead TB1.

Figure 9:
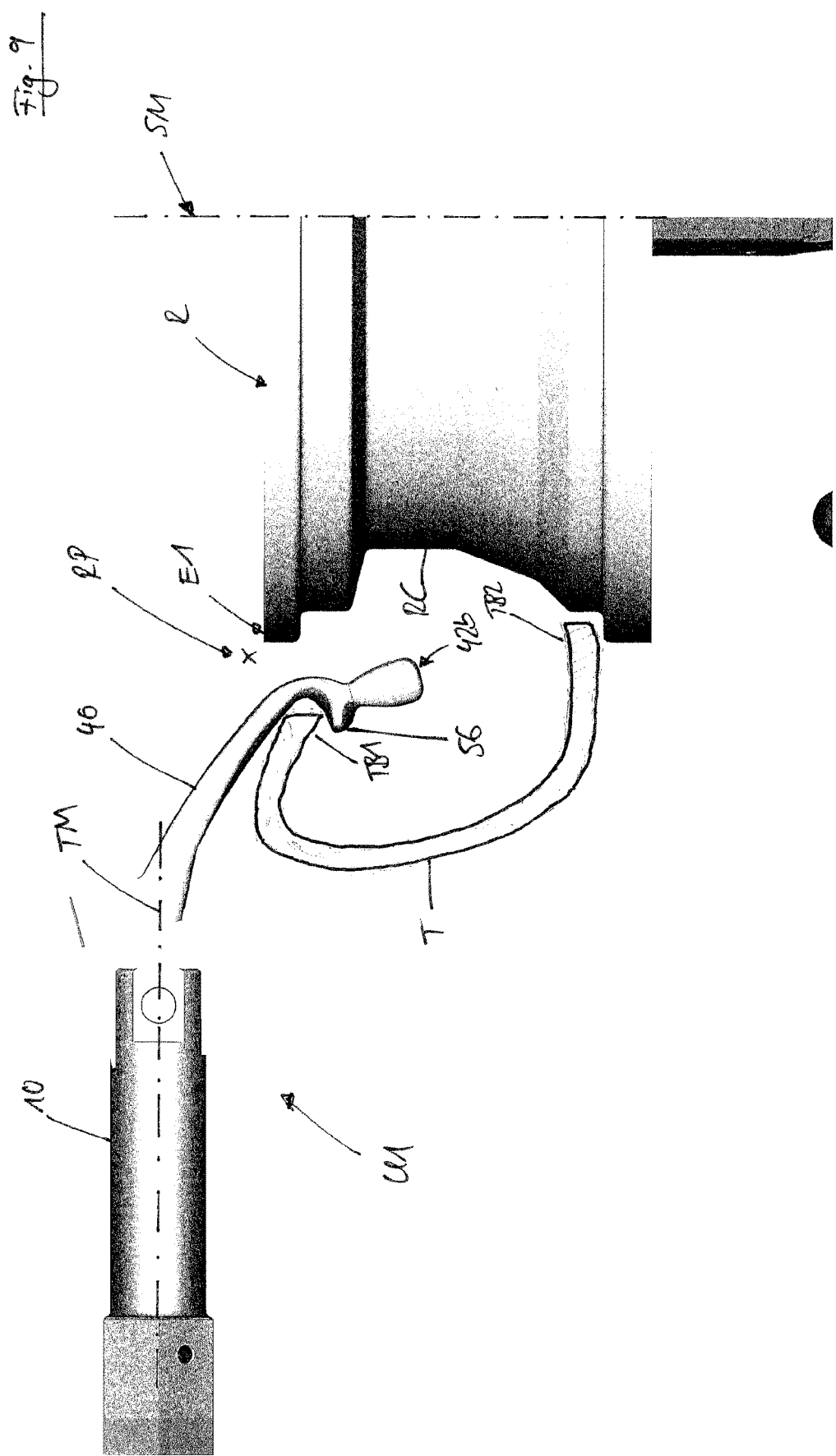
FIG. 9 shows a second step of a demounting procedure.

When the hook is in contact with the tyre bead and the tyre bead TB1 rests in the hook opening 56a (cf. FIG. 9), the first mounting/demounting tool unit U1 is moved to the left, with respect to FIG. 9, to pull the tyre bead TB1 away from the edge E1 of the rim R. This is shown in FIG. 9. The rim now is turned about the axis SM, so that the tyre T is pulled away from the rim R.

Figure 10:
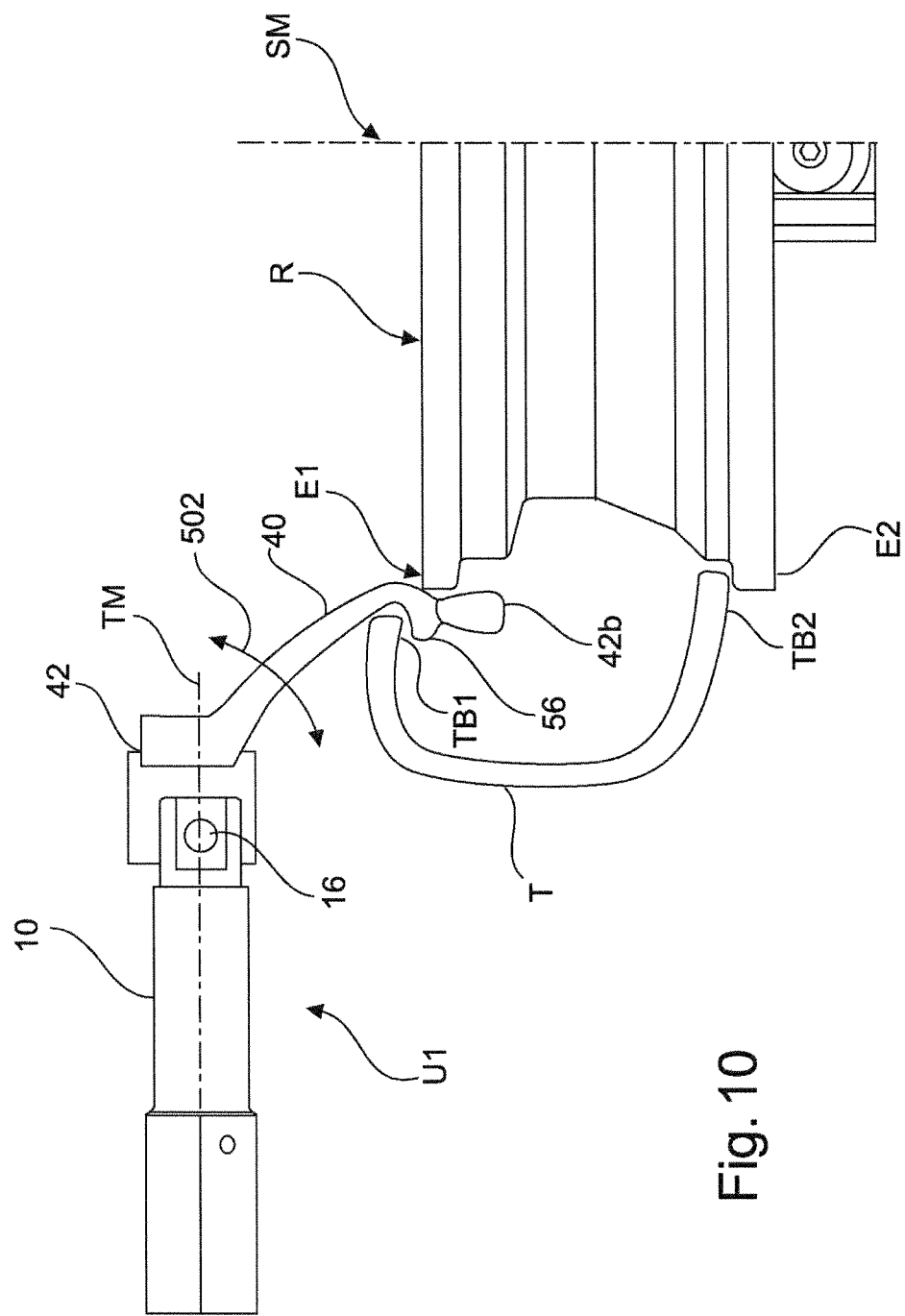
FIG. 10 shows a third step of a demounting procedure.
Figure 11:
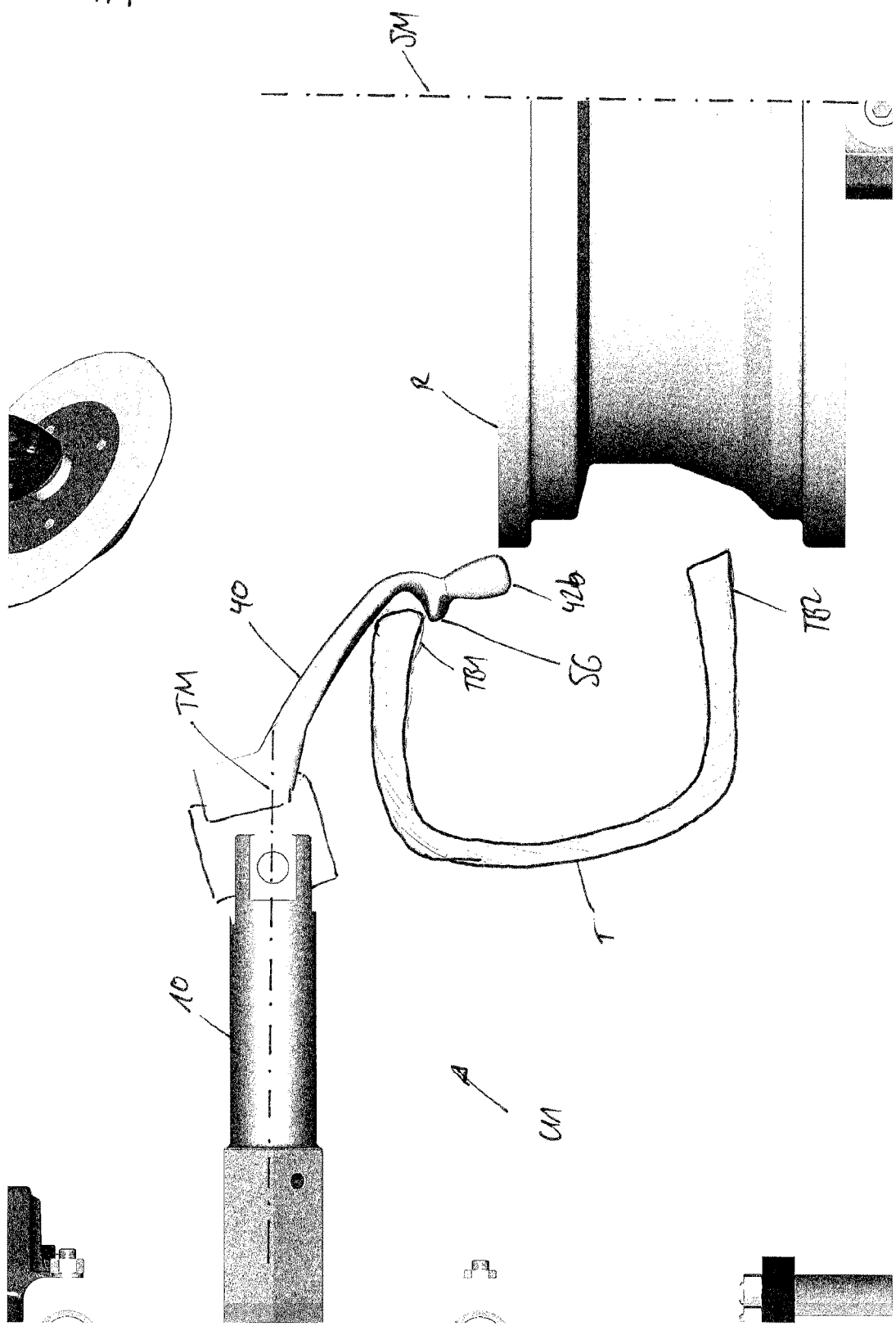
FIG. 11 shows a fourth step of a demounting procedure.

Now, the first mounting/demounting tool unit is operated by the operators so as to move upwards with respect to FIG. 9 (cf. also FIG. 10) and the position of the first mounting/demounting tool unit U1 is continuously and automatically adjusted with respect to the horizontal direction, to the right with respect to FIG. 10, i.e. radially towards the rim R. Due to this movement, the tyre T applies a force on the hook 56 via the tyre bead TB 1 and pulls the tool 40 downwards, so as to pivot about the pivot axis 16. This is indicated by the arrow 502. Now, the tyre is loosened and can be taken off the rim R, as shown in FIG. 11, in which the tool 40 again pivoted back to the resting position, shown in FIGS. 8 and 9. This movement of the tyre mounting/demounting unit U1 is done, and then the operator operates a mounting/demounting unit so that the tyre mounting/demounting unit U1 moves upwards with respect to FIG. 11, parallel to the axis SM and on the same time, the controller 500 controls the mounting/demounting device continuously and automatically such that the arm 10 moves to the left with respect to FIG. 11, parallel to the axis TM.

Figure 12:
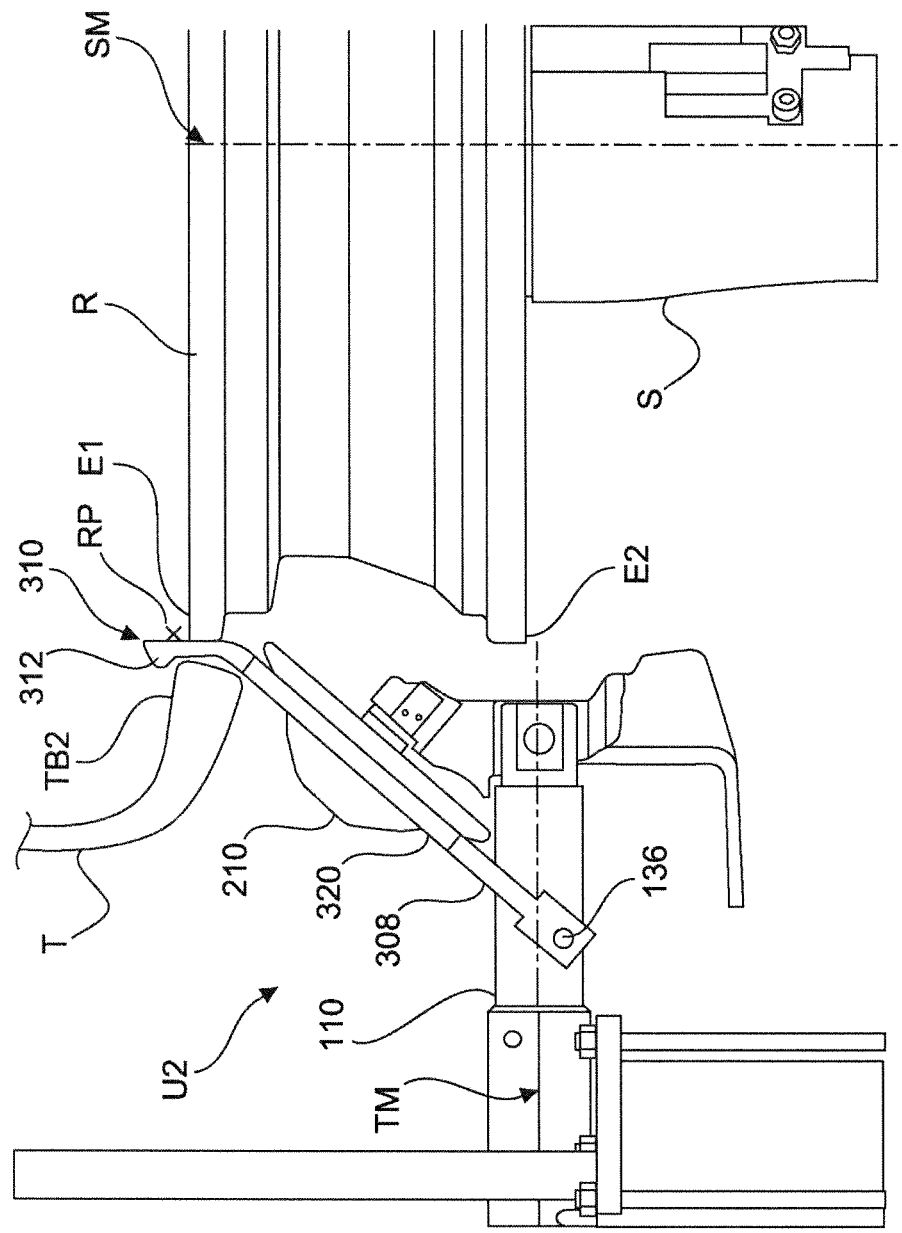
FIG. 12 shows a first step of a tyre mounting procedure.
Figure 13:
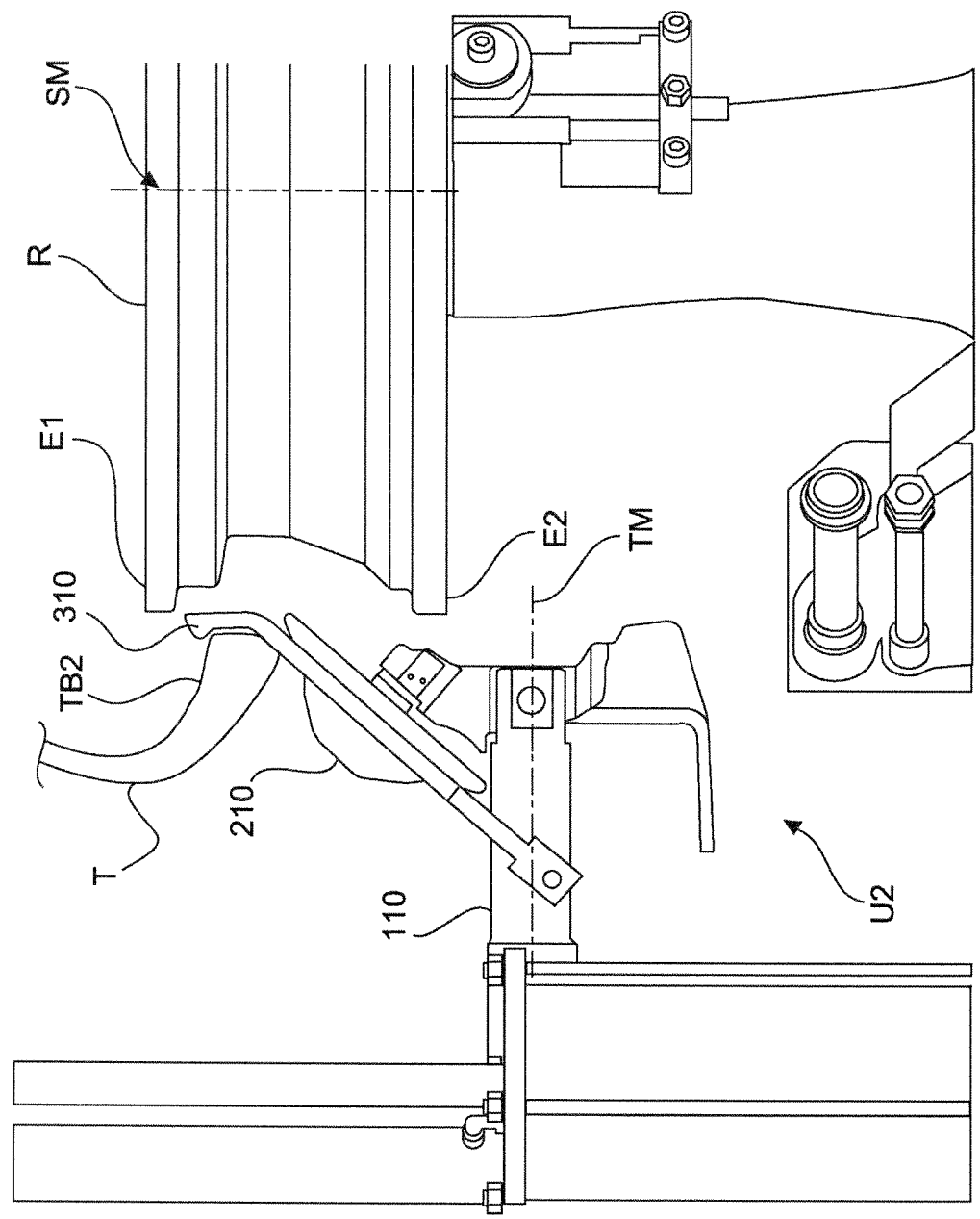
FIG. 13 shows a second step of a tyre mounting procedure.
Figure 14:
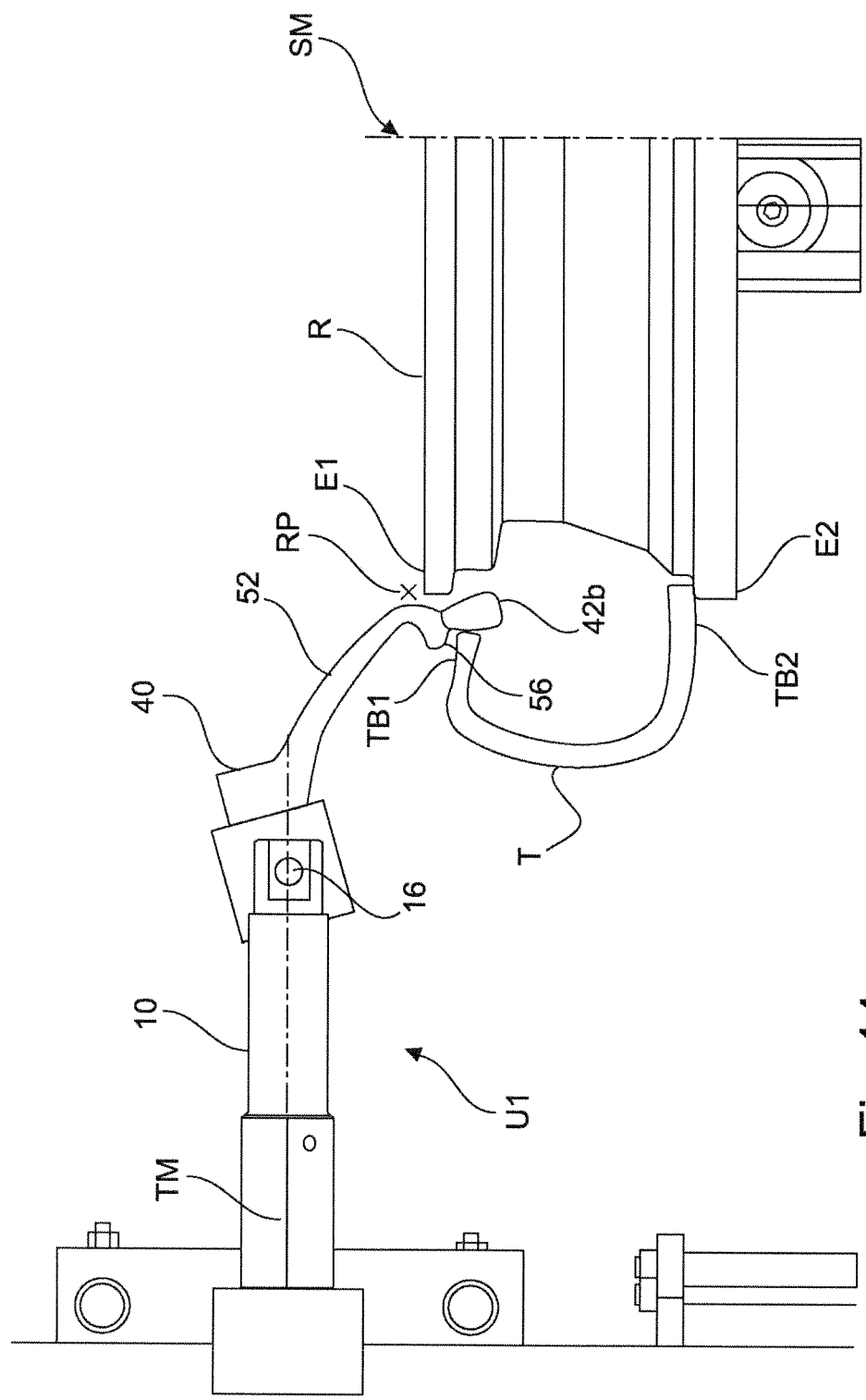
FIG. 14 shows a third step of a tyre mounting procedure.
Figure 15:
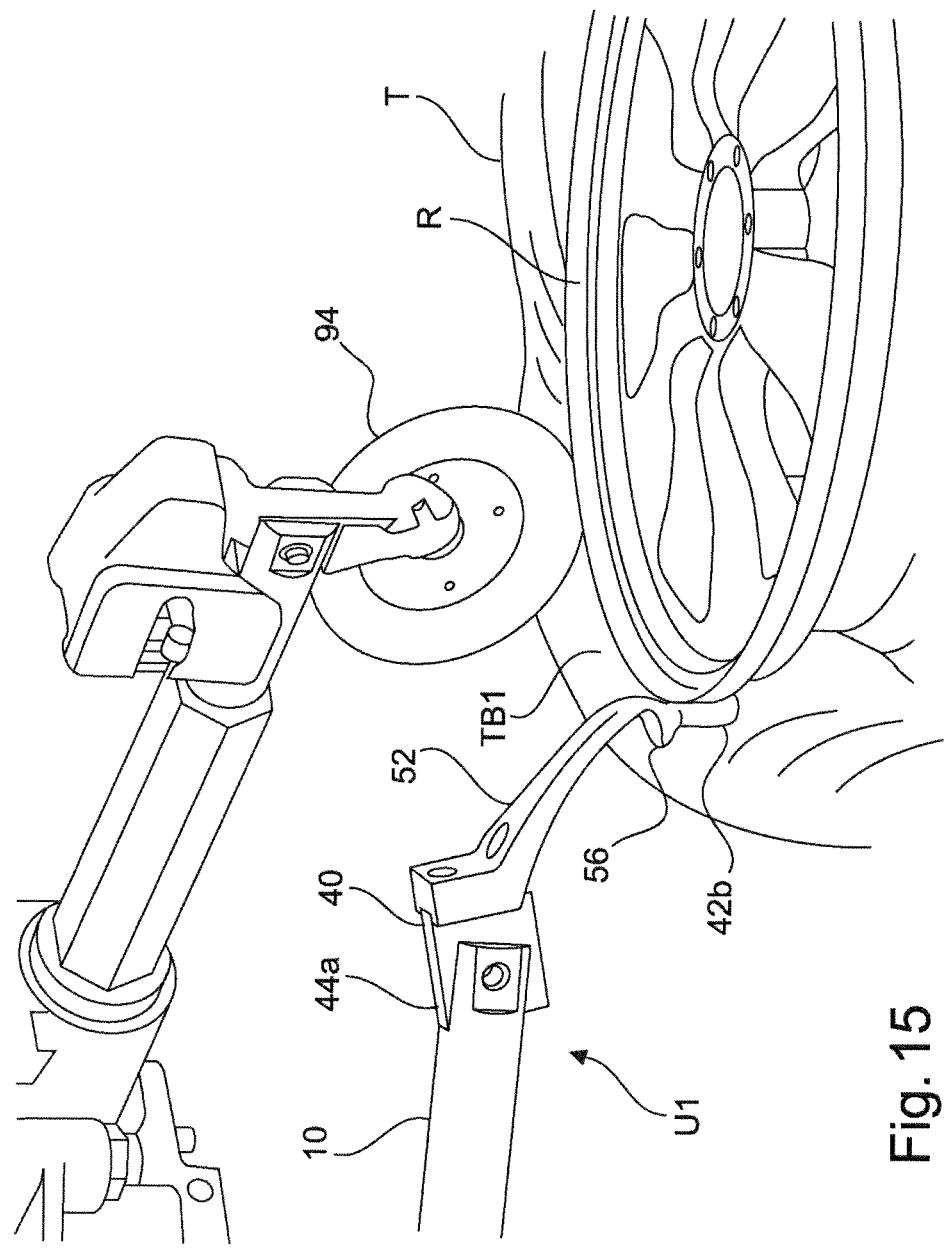
FIG. 15 shows a fourth step of a tyre mounting procedure.

When a tyre T is removed from the rim R, usually a new tyre T needs to be mounted on the rim R. This is shown in FIGS. 12 to 15. The tyre T is placed on the top of the rim R clamped on the support S and the operator operates the mounting/demounting device such that the second tyre mounting/demounting unit U2 moves upwards with respect to the axis SM. At the same time, the controller controls the second tyre mounting/demounting unit U2 such that it moves in a horizontal direction parallel to the axis TM such that it arrives at the initial reference point RP, as shown in FIG. 12. The mounting support tool element 310 now comes in contact with the lower tyre bead TB 2 of the tyre T and grabs behind it. When the operator now operates the second mounting/demounting unit U2 in such a way that it moves downward to pull the tyre T about the rim R, the controller controls the second tyre mounting/demounting unit U2 at the same time to move away from the rim R in a radial direction, parallel to the axis TM, such that the tyre bead TB2 is in contact with the mounting support tool element 310 so that it can be pulled over the edge E1 of the rim R. After the tyre is pulled down and the tyre bead TB2 comes in contact with the lower edge E2 of the rim R (cf. FIG. 14), the first mounting/demounting tool unit U1 again moves to the initial reference point RP, the second end 42b comes in contact with the tyre bead TB 1 and the hook 56 in this operation functions to push the tyre bead TB 1 downwards so that the tyre bead is moved behind the first edge E1 of the rim R. For this operation, the operator again only moves the first tyre mounting/demounting unit U1 downwards and the controller moves the unit U1 slightly to the left, thus radially away from the rim R, so that the second end 42b can be moved behind the edge E1. Again, the rim is rotated and the upper bead breaker 94 comes in contact with the upper bead TB1, to finish the mounting operation of the tyre T (cf. FIG. 15).

The invention claimed is:

1. A method for mounting a tyre on a rim of a vehicle wheel or for demounting a tyre from a rim of a vehicle wheel, in which a mounting/demounting device is supported by a post of a tyre mounting/demounting machine and is movable at least in a first direction, which is substantially parallel with respect to a rotational axis of the vehicle wheel, and in a second direction, which is substantially perpendicular with respect to said rotational axis of the vehicle wheel, comprising the steps of:
   (a) determining an initial reference position for the mounting/demounting device, said initial reference position being proximal to an edge of the wheel rim;
   (b) linking the position of the mounting/demounting device with the initial reference position;
   (c) adjusting the position of the mounting/demounting device entirely manually with respect to exactly one of either the first or the second direction;
   (d) continuously detecting the position of the mounting/demounting device with respect to both of said first and second directions; and
   (e) by a controller, at the same time as step (c), continuously and entirely automatically adjusting the position of the mounting/demounting device with respect to only the other one of said either first or second direction, in dependence of the initial reference position and the manually adjusted position of the mounting/demounting device in said exactly one of said either first or second direction.

2. The method according to claim 1, wherein the determined initial reference position is stored in a storing device.

3. The method according to claim 1, wherein the initial reference position for the mounting/demounting device is manually selected by an operator.

4. The method according to claim 1, wherein the mounting/demounting device comprises a rotary bead breaker.

5. The method according to claim 1, wherein the mounting/demounting device comprises a first mounting/demounting tool unit, comprising:
   a tool carrier arm having a center line and a first as well as a second end, and a mounting/demounting tool having a first as well as a second end and a hook arranged in the region of the second end, and being pivotally mounted to the tool carrier arm in the region of its first end,
wherein means for reversibly urging the mounting/demounting tool in a resting/operating position and for positioning the mounting/demounting tool in said resting/operating position are provided.

6. The method according to claim 1, wherein the mounting/demounting device comprises a second mounting/demounting tool unit, comprising:
a carrier unit having a first as well as a second end,
a bead breaker tool for loosening the tyre bead from the rim edge of a wheel, having a first as well as a second end, the first end is provided with at least one bead breaker tool element and the second end is adapted to be mounted to the carrier unit via the first support means, and
a mounting support tool for supporting the mounting of at least one tyre bead of a tyre to be mounted on a rim, the mounting support tool having a first as well as a second end, the first end is provided with at least one mounting support tool element and the second end is adapted to be mounted to the carrier unit via the second support means,
wherein the shape of the bead breaker tool element and the shape of the mounting support tool are at least partially congruent to each other, and
wherein the carrier unit is provided with first support means for receiving the bead breaker tool and second support means for receiving the mounting support tool.

7. The method according to claim 1, wherein the step of determining the initial reference position for the mounting/demounting device and the step of positioning the mounting/demounting device in correspondence with the initial reference position, are carried out in a single step.

8. The method according to claim 1, wherein the first direction, which is substantially parallel with respect to a rotational axis of the vehicle wheel, is a substantially vertical direction.

9. The method according to claim 1, wherein the second direction, which is substantially perpendicular with respect to said rotational axis of the vehicle wheel, is a substantially horizontal direction.

10. A method for mounting a tyre on a rim of a vehicle wheel or for demounting a tyre from a rim of a vehicle wheel, in which a mounting/demounting device is supported by a post of a tyre mounting/demounting machine and is movable at least in a first direction, which is substantially parallel with respect to a rotational axis of the vehicle wheel, and in a second direction, which is substantially perpendicular with respect to said rotational axis of the vehicle wheel, comprising the steps of:
(a) determining an initial reference position for the mounting/demounting device, said initial reference position being proximal to an edge of the wheel rim;
(b) linking the position of the mounting/demounting device with the initial reference position;
(c) entirely manually adjusting the position of the mounting/demounting device with respect to only the first direction;
(d) continuously detecting the position of the mounting/demounting device with respect to both of said first and second directions; and
(e) by a controller, at the same time as step (c), continuously and entirely automatically adjusting the position of the mounting/demounting device with respect to the second direction only, in dependence of the initial reference position and the manually adjusted position of the mounting/demounting device in the first direction.

11. The method according to claim 10, wherein the controller continuously and automatically adjusts the position of the mounting/demounting device with respect to the second direction only, in dependence of the initial reference position and the manually adjusted position of the mounting/demounting device in the first direction, such that a mounting/demounting tool of the mounting/demounting device moves around the wheel rim edge to move into the rim channel and touch the tyre bead to pull it off the rim.

12. A method for mounting a tyre on a rim of a vehicle wheel or for demounting a tyre from a rim of a vehicle wheel, in which a mounting/demounting device is supported by a post of a tyre mounting/demounting machine and is movable at least in a first direction, which is substantially parallel with respect to a rotational axis of the vehicle wheel, and in a second direction, which is substantially perpendicular with respect to said rotational axis of the vehicle wheel, comprising the steps of:
(a) determining an initial reference position for the mounting/demounting device, said initial reference position being proximal to an edge of the wheel rim;
(b) linking the position of the mounting/demounting device with the initial reference position;
(c) entirely manually adjusting the position of the mounting/demounting device with respect to only the second direction;
(d) continuously detecting the position of the mounting/demounting device with respect to both of said first and second directions; and
(e) by a controller, at the same time as step (c), continuously and entirely automatically adjusting the position of the mounting/demounting device with respect to the first direction only, in dependence of the initial reference position and the manually adjusted position of the mounting/demounting device in the second direction.

13. The method according to claim 12, wherein the controller continuously and automatically adjusts the position of the mounting/demounting device, with respect to the first direction, in dependence of the initial reference position and the manually adjusted position of the mounting/demounting device in the second direction, such that a mounting/demounting tool of the mounting/demounting device moves around the wheel rim edge to move into the rim channel and touch the tyre bead to pull it off the rim.

14. A method for mounting a tyre on a rim of a vehicle wheel or for demounting a tyre from a rim of a vehicle wheel, in which a mounting/demounting device is supported by a post of a tyre mounting/demounting machine and is movable at least in a vertical direction, which is substantially parallel with respect to a rotational axis of the vehicle wheel, and in a horizontal direction, which is substantially perpendicular with respect to said rotational axis of the vehicle wheel, comprising the steps of:
(a) determining an initial reference position for the mounting/demounting device, said initial reference position being proximal to an edge of the wheel rim;
(b) linking the position of the mounting/demounting device with the initial reference position;
(c) entirely manually adjusting the position of the mounting/demounting device with respect to only the vertical direction;

(d) continuously detecting the position of the mounting/demounting device with respect to said vertical direction and said horizontal direction; and (e) by a controller, at the same time as step (c), continuously and entirely automatically adjusting the position of the mounting/demounting device with respect to the horizontal direction only, in dependence of the initial reference position and the manually adjusted position of the mounting/demounting device in the vertical direction.

* * * * *